US008606264B2

(12) United States Patent
Guo et al.

(10) Patent No.: US 8,606,264 B2
(45) Date of Patent: Dec. 10, 2013

(54) METHOD AND DEVICE FOR PROCESSING INFORMATION GIVEN IDLE-MODE SIGNALING REDUCTION

(75) Inventors: Xiaolong Guo, Shenzhen (CN); Ming Li, Shenzhen (CN); Wanqiang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 951 days.

(21) Appl. No.: 12/617,361

(22) Filed: Nov. 12, 2009

(65) Prior Publication Data

US 2010/0056146 A1 Mar. 4, 2010

Related U.S. Application Data

(63) Continuation of application No. PCT/CN2009/071797, filed on May 14, 2009.

(30) Foreign Application Priority Data

Jun. 18, 2008 (CN) .......................... 2008 1 0039352

(51) Int. Cl.
*H04W 4/00* (2009.01)
*H04W 88/06* (2009.01)
*H04W 92/02* (2009.01)
*H04W 88/02* (2009.01)

(52) U.S. Cl.
CPC .............. *H04W 88/06* (2013.01); *H04W 92/02* (2013.01); *H04W 88/02* (2013.01)
USPC ..................... 455/426.1; 455/433; 455/435.1; 455/435.2; 370/338; 370/355

(58) Field of Classification Search
USPC ......... 455/426.1, 433, 435.1, 435.2; 370/338, 370/355
See application file for complete search history.

(56) References Cited

U.S. PATENT DOCUMENTS

| 6,539,237 B1 | 3/2003 | Sayers et al. |
| 8,139,505 B2 | 3/2012 | Guo et al. |

(Continued)

FOREIGN PATENT DOCUMENTS

| CN | 1798040 A | 7/2006 |
| CN | 101005692 A | 7/2007 |

(Continued)

OTHER PUBLICATIONS

Final Office Action received in U.S. Appl. No. 13/280,907, mailed Aug. 24, 2012, 13 pages.

(Continued)

*Primary Examiner* — William D Cumming
(74) *Attorney, Agent, or Firm* — Slater & Matsil, L.L.P.

(57) ABSTRACT

A method for processing information given Idle-mode Signaling Reduction and related devices, the method includes: receiving an information update request that contains identification information for identifying a UE and information of a current access network where the UE is located; and processing information relating to an access network, with which the UE is registered, according to the information update request and the identification information for identifying the UE, and information of the current access network where the UE is located contained in the information update request. A Serving Gateway includes an update request receiving unit and an information processing unit; an MME, includes an update constructing unit and an update request sending unit; and an SGSN, includes a second update constructing unit and a second update request sending unit. The foregoing method and devices combine to implement information processing given Idle-mode Signaling Reduction.

20 Claims, 14 Drawing Sheets

(56) References Cited

U.S. PATENT DOCUMENTS

| | | | |
|---|---|---|---|
| 8,144,665 | B2 | 3/2012 | Hu et al. |
| 8,295,852 | B2 | 10/2012 | Buracchini et al. |
| 2005/0135375 | A1 | 6/2005 | Hurtta et al. |
| 2009/0213762 | A1 | 8/2009 | Guo et al. |
| 2010/0056146 | A1* | 3/2010 | Guo et al. ................ 455/435.2 |
| 2010/0061331 | A1 | 3/2010 | Guo et al. |
| 2010/0118790 | A1 | 5/2010 | Guo et al. |
| 2010/0220689 | A1 | 9/2010 | Hu et al. |
| 2011/0013623 | A1* | 1/2011 | Hu et al. ..................... 370/355 |
| 2011/0090848 | A1 | 4/2011 | Kim et al. |
| 2011/0116449 | A1 | 5/2011 | Hu et al. |
| 2011/0261780 | A1 | 10/2011 | Hu et al. |
| 2011/0275371 | A1 | 11/2011 | Roger |
| 2012/0040671 | A1* | 2/2012 | Guo et al. ................ 455/435.1 |
| 2012/0063300 | A1 | 3/2012 | Sahin et al. |
| 2012/0076121 | A1* | 3/2012 | Choi et al. .................. 370/338 |
| 2012/0142341 | A1* | 6/2012 | Nagpal et al. ............. 455/426.1 |
| 2012/0142349 | A1 | 6/2012 | Guo et al. |
| 2012/0157093 | A1 | 6/2012 | Zhu et al. |
| 2012/0302234 | A1* | 11/2012 | Wallis et al. ................ 455/433 |

FOREIGN PATENT DOCUMENTS

| | | |
|---|---|---|
| CN | 101448251 A | 6/2009 |
| WO | WO 2009/152713 A1 | 12/2009 |

OTHER PUBLICATIONS

Office Action received in United States Patent and Trademark Application No. 13/280,907 mailed Dec. 10, 2012, 15 pages.

International Search Report, PCT/CN2009/071797, dated Aug. 20, 2009, 4 pages.

"$3^{rd}$ Generation Partnership Project; Technical Specification Group Services and System Aspects; General Packet Radio Service (GPRS) Enhancements for Evolved Universal Terrestrial Radio Access Network (E-UTRAN) Access (Release 8)," 3GPP TS 23.401 V8.2.0, Jun. 2008, 182 pages.

3rd Generation Partnership Project, "Technical Specification Group Services and System Aspects; 3GPP System Architecture Evolution: Report on Technical Options and Conclusions," Global System for Mobile Communications, Release 7, 3GPP TR 23.882 v1.15.0, Feb. 2008, pp. 1-262.

3rd Generation Partnership Project, "Update of Tracking Area Update and Routing Area Update Procedure," Change Request 23.401 CR 0222 rev 1, Revision of S2-082212, 3GPP TSG-SA WG2, Meeting No. 64, Apr. 7-11, 2008, 28 pages.

3rd Generation Partnership Project, "Remained Open Issues on ISR," ZTE, Agenda 8.2.8, SAES/REL-8, 3GPP TSG SA WG2 Meeting No. 64b adhoc and No. 65, May 7-9, 2008 and May 12-16, 2008, pp. 1-3.

3rd Generation Partnership Project, "Technical Specification Group Services System Aspects General Packet Radio Service (GPRS) Enhancements for Evolved Universal Terrestrial Radio Access Network (E-UTRAN) Access," Global System for Mobile Communications, Release 8, 3GPP TS 23.401 v8.2.0, Jun. 2008, 13 pages.

Written Opinion of the International Searching Authority, International Application No. PCT/CN2009/071797, Applicant: Huawei Technologies Co., Ltd., et al., Aug. 20, 2009, 5 pages.

1st Chinese Office Action, Chinese Application No. 200810039352.2, Applicant: Huawei Technologies Co., Ltd., et al., Mar. 23, 2011, pp. 1-50.

* cited by examiner

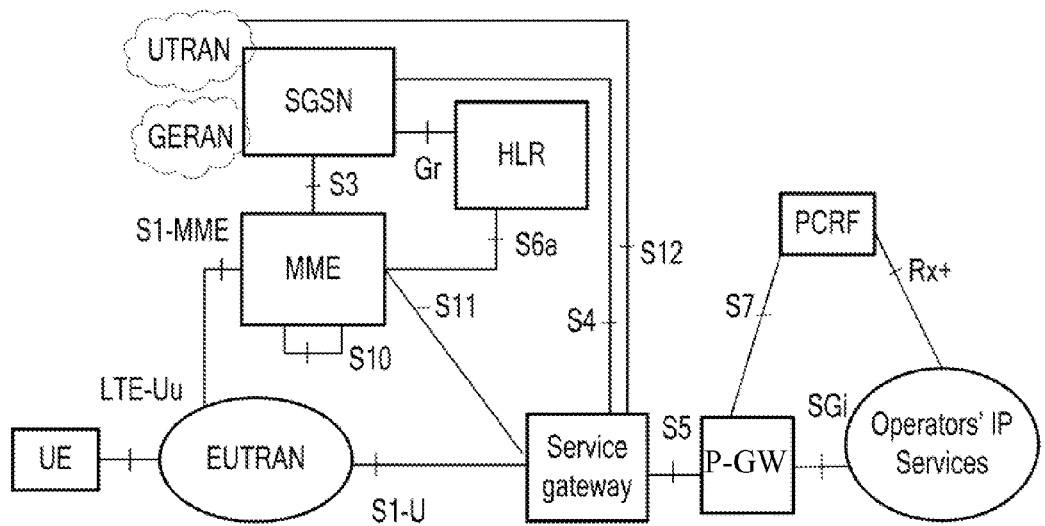

The Service Gateway receives an information update request, which contains identification information for identifying a UE and information of a current access network where a UE is located     — 101

The Service Gateway processes the information relating to an appropriate access network with which the UE is registered according to the information update request, and the identification information for identifying the UE and the information the current access network where the the UE is located contained in the information update request     — 102

FIG. 2

METHOD AND DEVICE FOR PROCESSING INFORMATION GIVEN IDLE-MODE SIGNALING REDUCTION

CROSS-REFERENCE TO RELATED APPLICATIONS

This application is a continuation of International Patent Application No. PCT/CN2009/071797, filed on May 14, 2009, which claims priority to Chinese Patent Application No. 200810039352.2, filed on Jun. 18, 2008, both of which are hereby incorporated by reference in their entireties.

FIELD OF INVENTION

The present invention relates to a technical field of radio communication, and in particular, to a method of information processing given Idle-mode Signaling Reduction and related devices.

BACKGROUND

Mobile communication networks are evolving continuously. The Universal Mobile Telecommunications System (UMTS) is a 3GPP-defined third-generation technical standard for radio communication networks. With a structure similar to the second-generation mobile communication systems, the UMTS includes a Universal Terrestrial Radio Access Network (UTRAN), a Core Network (CN), and a User Equipment (UE). The UTRAN is a terrestrial radio access network and configured to handle all radio functions and operations. The UTRAN includes one or more Radio Network System (RNS), each of which includes a Radio Network Controller (RNC) and one or more NodeB. The Core Network is configured to handle all voice calls and data interaction of the UMTS and perform switching and routing functions with external. The Core Network further includes a Packet-Switched (PS) domain and a Circuit-Switched (CS) domain. The PS domain includes a Serving General Packet Radio Service (GPRS) Support Node (SGSN), a Gateway GPRS Supporting Node (GGSN), and a Home Location Register (HLR).

Currently, 3GPP is researching low-cost evolving network architecture that the time delay may be reduced, the user data rates may be increased and the system capacity and coverage may be improved, and the evolving network architecture may support future mobile network applications, including Long-Term Evolution (LTE) of access network and System Architecture Evolution (SAE). For example, LTE access network generally may be Evolving Universal Terrestrial Radio Access Networks (E-UTRAN).

FIG. 1 is a simplified schematic diagram illustrating the current LTE/SAE network architecture. The evolving packet core network mainly includes three logic functional entities, namely Mobility Management Entity (MME), Service Gateway (S-GW), and Packet Gateway (P-GW). The MME is configured to store mobile management context of the UE, such as user identity, handle Non-Access Stratum (NAS) signaling and ensure the security of NAS signaling. The S-GW is configured to store user plane context of the UE, such as the IP address and routing information of the UE, and implement lawful interception and packet data routing. The S-GW is communicated with the MME through an S11 interface, which exchanges mobility management information and session control information of the UE. The P-GW is configured to route and forward packets, deliver enhanced charging policy, and filter packets based on each UE. The P-GW is communicated with the S-GW through an S5 interface to transfer control information such as information creation, modification and deletion, and implement packet data routing. The MME is communicated with the E-UTRAN control plane via the S 1-MME and the S-GW is communicated with the E-UTRAN network user plane via the S11. In addition, the MME is communicated with a 2G/3G access network via an S3 interface to anchor the mobility control plane of the UE between networks. The S-GW is communicated with an SGSN via an S4 interface to anchor the user plane of the UE between networks. The UE is communicated with the E-UTRAN control plane via an LTE-Uu interface. The MME is communicated with another MME via an S10 interface. An SGSN is communicated with an HLR via an Gr interface. A UTRAN is communicated with the Service Gateway via an S12 interface. The P-GW is communicated with a policy and charging rules function (PCRF) via an S7 interface. The P-GW is communicated with an operator's IP services via an SGi interface.

Notably, during the evolution from an old network to a new one, the old and evolving network will coexist for some time. In order to ensure the compatibility with existing systems, one of 3GPP's objectives in terms of network evolution, mobility management must be accomplished between E-UTRAN and UTRAN, and between two E-UTRANs of the Global System for Mobile (GSM) communication system.

The UE may roam between different areas of the same network. For example, when roaming between Routing Areas (RA) in the existing 2G/3G access network, the UE initiates a Routing Area Update (RAU) process. Obviously, the UE periodically updates its location during RA updating for the network to know that the UE is currently communicated with the network, so as to prevent the UE from being called continuously. While moving within the Tracking Area (TA), the UE initiates a Tracking Area Update (TAU) process. The UE may also roam between different networks. When moving to a new network, the UE registers with the current network. For example, when entering a first RA, the UE registers with the SGSN of the 2G/3G access network. When entering a first TA, the UE registers with the MME of the evolving network. When the UE moves out of the first TA and enters the first RA, it has to again register with the SGSN of the 2G/3G access network. In this way, the UE frequently registers with different networks, causing a considerable amount of registration signaling overhead.

An existing technology, known as Idle-mode Signaling Reduction (ISR) solution, may reduce the impact of registering and updating the UE working in Tunnel Endpoint Identifier (TEID) mode between radio access networks on air interfaces. In this situation, the UE may register with two different radio access networks simultaneously, thus eliminating the need for the UE to launch any registration process while moving between registration areas of these two networks. Specifically, a Serving Gateway of the access network where the UE is located may carry the information of the access network, with which the UE is registered. Given existing Idle-mode Signaling Reduction, information is processed in this way: When the UE registers with the current access network, the corresponding Serving Gateway may carry information relating to the current network. When the UE registers with another access network and the Serving Gateway remains unchanged, the Serving Gateway may carry information relating to the new access network. Thus, as the Serving Gateway carries information of the two different access networks, with which the UE is registered, no registration process is launched when the UE moves between registration areas of the two networks.

While researching and practicing the method of information processing given the signaling restriction, the present inventor has noted the following.

Given the signaling restriction, the Serving Gateway carries information relating to the two access networks, with which the UE is registered. When the UE moves within the corresponding areas of these two access networks, the Serving Gateway needs to update the information relating to the current access network where the UE is located. In this way, the UE may communicate normally. When updating the current access network where the UE is located, the existing Serving Gateway often updates the information relating to other access networks, with which the UE is registered, causing the UE to initiate a re-registration process while moving to another network. This adversely affects the UE's communication when the UE moves between access network areas. The issue remains unresolved so far.

SUMMARY

A method for processing information given Idle-mode Signaling Reduction and related devices are provided in the embodiments of the present invention to enable a service network to process network information contained in the information without affecting other network information when a UE moves between networks specified in Serving Gateway information given Idle-mode Signaling Reduction and to ensure that the UE may communicate when moving between access networks specified in the Serving Gateway information.

A method for processing information given Idle-mode Signaling Reduction is provided in an embodiment of the present invention. The method includes:

receiving an information update request, which contains identification information for identifying a UE, and information of a current access network where the UE is located; and processing information relating to an access network, with which the UE is registered, according to the information update request and the identification information for identifying the UE, and information of the current access network where the UE is located contained in the information update request.

A method for processing information given Idle-mode Signaling Reduction is provided in another embodiment of the present invention. The method includes:

constructing an information update request, which contains identification information for identifying a UE, and information of a current access network where the UE is located; and sending the information update request to a corresponding Serving Gateway for performing information processing.

A method for processing information given Idle-mode Signaling Reduction is provided in another embodiment of the present invention. The method includes:

receiving an information creation request, which contains indication information used for indicating a current access network where a UE is located;

assigning a corresponding control plane TEID corresponding to the current access network where the UE is located according to the indication information used for indicating the current access network where the UE is located contained in, the information creation request; and storing information relating to the current access network where the UE is located.

A method for processing information given Idle-mode Signaling Reduction includes:

receiving information release requests from a current access network where a UE is located and other access networks; and releasing a control plane TEID.

A Serving Gateway is provided in another embodiment of the present invention. The Serving Gateway includes:

an update request receiving unit, configured to receive an information update request, which contains identification information for identifying a UE, and information of a current access network where the UE is located; and an information processing unit, configured to process information relating to an access network, with which the UE is registered, according to the information update request received by the update request receiving unit and the identification information for identifying the UE, and information of the current access network where the UE is located contained in the information update request.

A mobility management entity is provided in another embodiment of the present invention. The entity includes:

an update constructing unit, configured to construct an information update request, which contains identification information for identifying a UE, and information of a current access network where the UE is located; and an update request sending unit, configured to send the information update request constructed by the update constructing unit to a corresponding Serving Gateway for performing information processing.

A Serving General Packet Radio Service (GPRS) support node (SGSN) is provided in the present invention. The node includes:

a second update constructing unit, configured to construct an information update request, which contains identification information for identifying a UE, and information of a current access network where the UE is located; and a second update request sending unit, configured to send the information update request constructed by the second update constructing unit to a corresponding Serving Gateway for performing information processing.

As discussed in the method for processing information given restricted signaling provided herein, when the UE moves between different access networks or within different areas of the same access network, after receiving the information update request, the Serving Gateway may process the corresponding information of the access network of the UE without affecting information of other access network, with which the UE is registered according to the information update request and the identification information for identifying the UE and the information of the current access network where the UE is located contained in the information update request. Therefore, the system errors that occur when a Serving Gateway does not know which access network's information it should process given Idle-mode Signaling Reduction in existing technology may be corrected, so as to guarantee communication when a UE moves between access networks specified in the Serving Gateway information given Idle-mode Signaling Reduction.

BRIEF DESCRIPTION OF THE DRAWINGS

In order to clarify the embodiments of the present invention or existing technical solutions, the following section provides the drawings necessary for the description of these embodiments or solutions. It is apparent that the following drawings only represent some embodiments of the present invention. Those skilled in the art are able to derive other drawings from these ones without innovations.

FIG. 1 is a simplified schematic diagram illustrating an existing LTE/SAE network structure;

FIG. 2 is a simplified schematic diagram illustrating a method for processing information given Idle-mode Signaling Reduction provided in a first embodiment of the present invention;

DETAILED DESCRIPTION

Figure 3:
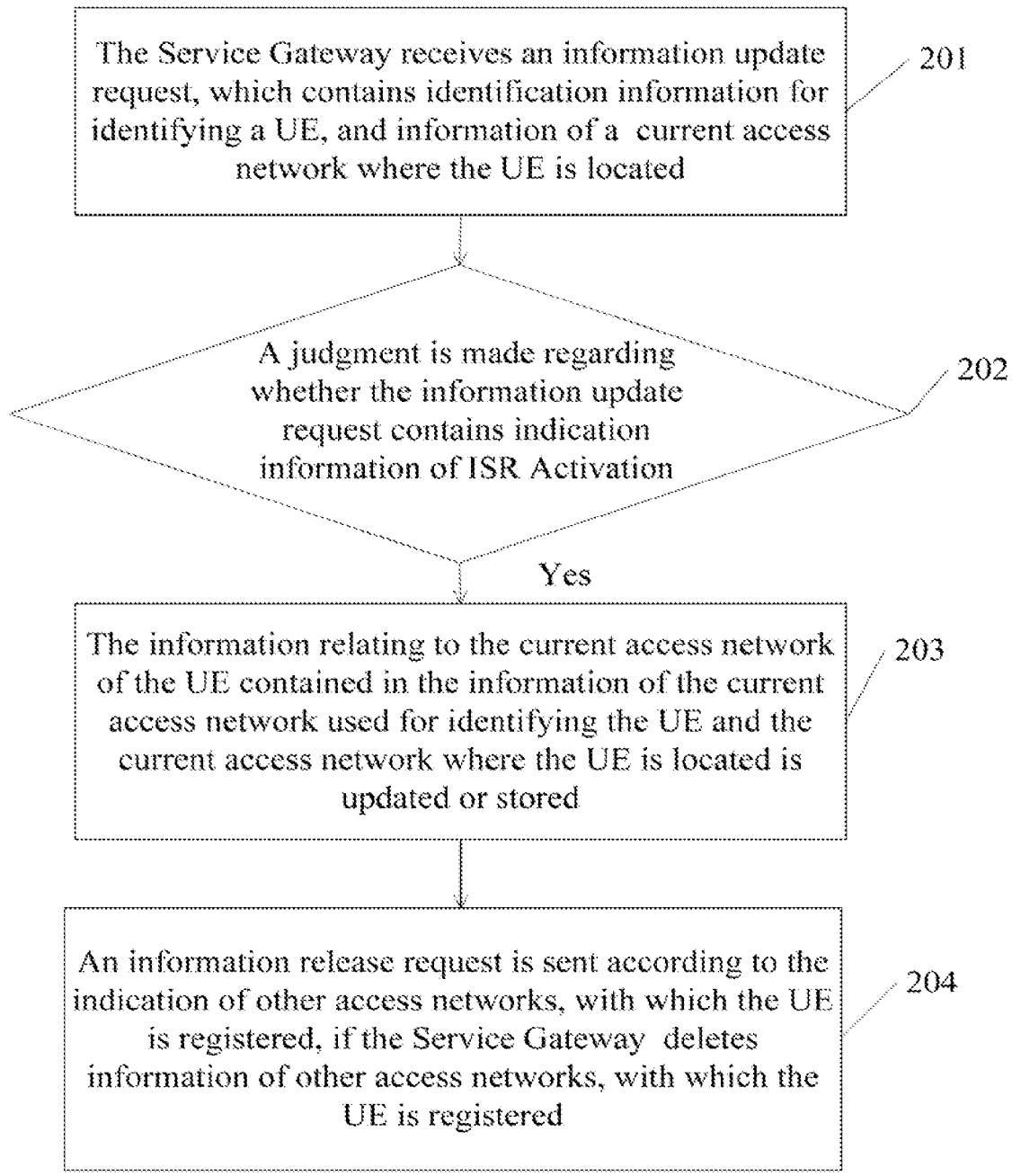
FIG. 3 is a simplified schematic diagram illustrating a method for processing information given Idle-mode Signaling Reduction provided in a second embodiment of the present invention.

Based on the drawings provided in the embodiments herein, the following section will fully and clearly describe the technical solutions specified in the embodiments of the present invention. Obviously, the embodiments described herein form only part of the embodiments of the present invention. Any other embodiments derived by semi-skilled technicians without innovation in this field from the embodiments described herein are also covered by the present invention.

The embodiments of the present invention provide methods for processing signaling given Idle-mode Signaling Reduction and related devices intended for use in radio communication. Details are given below relating to the methods of signaling processing given Idle-mode Signaling Reduction and related devices.

A First Embodiment

This embodiment provides a method for processing information given Idle-mode Signaling Reduction and applies when a Serving Gateway related to an access network remains unchanged given Idle-mode Signaling Reduction and a UE moves between different access networks or different areas of the same access network. FIG. 2 shows the flowchart of this method, including the following steps.

Step 101: A Serving Gateway receives an information update request, which contains identification information for identifying a UE, and information of a current access network where a UE is located.

It may be understood that an MME or SGSN sends the information update request of the UE. When the UE moves to an E-UTRAN, the MME of the E-UTRAN adds the identification information for identifying the UE, and information of the E-UTRAN (for example, access network type information of the E-UTRAN) into the information update request according to a TA update request of the E-UTRAN from the UE and sends the information update request to a related Serving Gateway.

Likewise, when the UE moves to a 2G/3G access network, an SGSN of the 2G/3G access network sends an information update request, which contains identification information for identifying the UE, and information of the 2G/3G access network.

The identification information for identifying the UE, and information of the current access network where the UE is located may be a control plane TEID and access type indication information (i.e. Radio Access Type, RAT, Type), respectively, of an access network with which the UE is registered. TEID is classified into control plane TEID and user plane TEID. The control plane TEID is designed to search UE context and may uniquely identify UEs. The user plane TEID is designed for sending data. The Serving Gateway assigns the two type TEIDs to the access network with which the UE is registered when the UE is registering with the network.

The identification information for identifying the UE, and information of the current access network where the UE is located may also be the control plane TEID of the current access network where the UE is located. This requires the Serving Gateway to assign different control plane TEIDs to the different access networks with which the UE is registered. In this way, the TEID may not only identify a UE but also a current access network where the UE is located.

Obviously, the identification information for identifying a UE, and information of a current access network where the UE is located may vary. This embodiment provides a number of alternatives without limiting the generality of the present prevention.

Step 102: The Serving Gateway processes the information relating to the access network with which the UE is registered according to the information update request and the identification information for identifying the UE and the information of the current access network where the UE is located contained in the information update request.

When the current access network where the UE is located is identified by the identification information as E-UTRAN, the Serving Gateway may process information of the E-UTRAN, with which the UE is registered; when the current access network where the UE is located is identified by the identification information as 2G/3G access network, the Serving Gateway may process information of the 2G/3G access network, with which the UE is registered.

Given Idle-mode Signaling Reduction, the Serving Gateway carries the information relating to the one or more access network, with which a UE is registered. When the UE moves between different access networks or within different areas of the same access network, the method for processing information given Idle-mode Signaling Reduction specified in this embodiment of the present invention is described as follows: After receiving an information update request, the Serving Gateway processes the information relating to the corresponding access network of the UE according to the information update request and the identification information for identifying the UE and the information of the current access network where the UE is located contained in the information update request without affecting the information of other one or more access network, with which the UE is registered. The method corrects system errors that occur when a Serving Gateway does not know which access network's information it should process given Idle-mode Signaling Reduction in existing technology, so as to guarantee communication when a UE moves between access networks specified in the Serving. Gateway information given Idle-mode Signaling Reduction.

A Second Embodiment

This embodiment provides a method for processing information given Idle-mode Signaling Reduction and realizes the first embodiment. This method applies when the Serving Gateway related to the access network remains unchanged given Idle-mode Signaling Reduction and a UE moves between different access networks or different areas of the same access network. In this embodiment, the current network where the UE is located initiates an ISR activation process. The process described in this embodiment is initiated when the MME or SGSN of the current access network where the UE is located supports the ISR function. FIG. 3 is the flowchart, including the following steps.

Step 201: A Serving Gateway receives an information update request, which contains identification information for identifying a UE, and information of a current access network where the UE is located and indication information of ISR Activation.

It may be understood that the identification information for identifying the UE, and information of the current access network where the UE is located may be a control plane TEID and access type indication information, respectively, of the access network with which the UE is registered. TEID is classified into control plane TEID and user plane TEID. The control plane TEID is designed to search UE context and may uniquely identify UEs. The user plane TEID is designed for sending data. The Serving Gateway assigns the two TEIDs to the access network with which a UE is registered when the UE is registering with the network. The current network where the UE is located is an E-UTRAN if the access type indication information indicates an MME. The current network where the UE is located is a 2G/3G access network if the access type indication information indicates an SGSN.

The identification information for identifying the UE and information of the current access network where the UE is located may also be a control plane TEID corresponding to the current access network where the UE is located. This requires the Serving Gateway to assign different control plane TEIDs to the different access networks with which the UE is registered. In this way, the TEID may identify a UE and its current access network.

Obviously, the identification information for identifying a UE, and information of its access network may vary. This embodiment provides a number of alternatives without limiting the generality of the present prevention.

Step 202: The Serving Gateway judges the information update request to determine that the information update request contains indication information of ISR Activation and derives the identification information for identifying the UE, and information of the current access network where the UE is located from the information update request.

Step 203: The Serving Gateway quires access network information carried by the Serving Gateway according to the identification information for identifying the UE, and information of the current access network where the UE is located. If the Serving Gateway carries information of an access network relating to the identification information for identifying the UE, and information of the current access network where the UE is located, it is obtained that the UE has been registered with the access network and the Serving Gateway needs to update the information of the access network. For example, if the current access network where the UE is located is an E-UTRAN, the Serving Gateway updates a control plane address, user plane address, and user plane TEID of an MME contained in a Mobility Management (MM) context, or updates a user plane TEID and user plane address of the base station contained in information context. When the current access network where the UE is located is a 2G/3G access network, the Serving Gateway updates the control plane address, user plane address and user plane TEID address of the SGSN contained in the MM context, or updates the user plane TEID and user plane address of the radio access network in the information context.

If the Serving Gateway does not carry the access network information related to the identification information for identifying the UE, and information of the current access network where the UE is located, it is indicated that the UE moves to the access network at a first time. In this situation, the Serving Gateway assigns a new control plane TEID for the access network, stores related information of the access network, and carry the new control plane TEID in the response message.

If the information update request contains the control plane TEID relating to the current access network where the UE is located, the Serving Gateway may also determine whether to update or store information using the following method.

The Serving Gateway judges if the control plane TEID relating to the current access network where the UE is located is null. If the control plane TEID is null, the Serving Gateway needs to assign a new control plane TEID for the current access network where the UE is located, store information regarding the access network, and carry the new control plane TEID in the response message.

It may be understood that the operation applies when the Serving Gateway provides the ISR function. If the gateway does not support the ISR function, information of other access networks, with which the UE is registered, must be deleted from the Serving Gateway in addition to the operation.

Step 204: In addition to deleting information of other access networks, with which the UE is registered, as discussed in Step 203, the Serving Gateway may send an information release request to an appropriate access network to release information relating to other access networks according to identification information of other access networks, with which the UE is registered.

In this embodiment, the Serving Gateway may also send the information release request to the related access network according to the control plane TEID, which the Serving Gateway assigns to other networks, so as to release information relating to Core Network equipment of other access networks. It may be understood that this step is not necessarily required.

This embodiment provides an ISR activation process. The process may be completed only when both the current access network where the UE is located and related Serving Gateway support the ISR function. This embodiment provides a simple application of the first embodiment. The control plane TEID corresponding to the current access network where the UE is located may be used to identify the UE and the current access network where the UE is located. Alternatively, the control plane TEID of the access network, with which the UE is registered, and the access type indication information may be used respectively to identify the UE and the current access network where the UE is located to yield the same effect as achieved in the first embodiment.

A Third Embodiment

Figure 4:
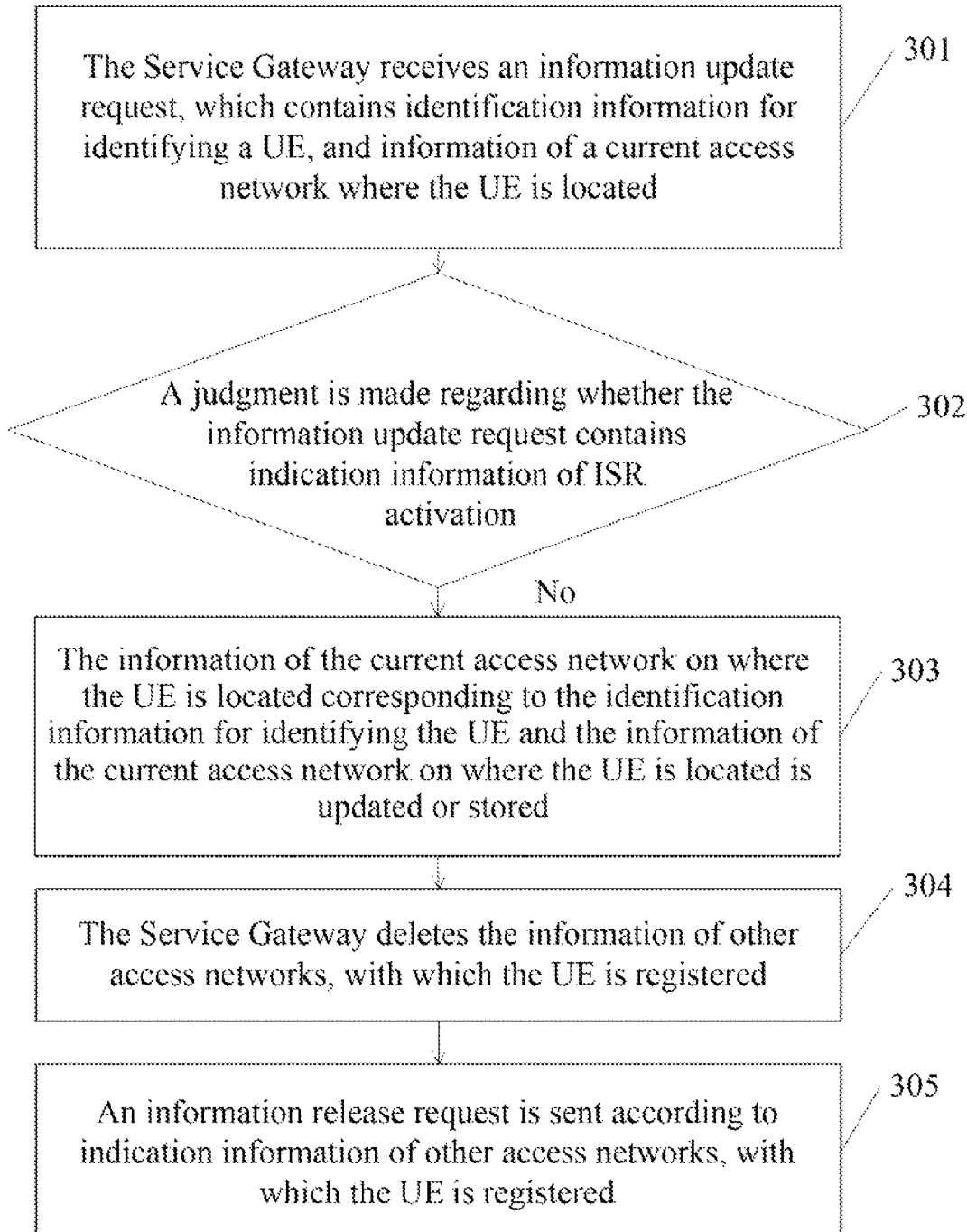
FIG. 4 is a simplified schematic diagram illustrating a method for processing information given Idle-mode Signaling Reduction provided in a third embodiment of the present invention.

This embodiment provides a method for processing information given Idle-mode Signaling Reduction and realizes the first embodiment. This method applies when the Serving Gateway related to the access network remains unchanged given Idle-mode Signaling Reduction and a UE moves between different access networks or different areas of the same access network. In this embodiment, the current access network where the UE is located initiates an ISR deactivation process. The process described in this embodiment may be initiated when the MME or SGSN of the current access network where the UE is located does not support the ISR function. FIG. 4 is the flowchart, including the following steps.

Step 301: A Serving Gateway receives an information update request, which contains identification information for identifying a UE, and information of a current access network where the UE is located.

It may be understood that in this embodiment, the identification information used to identify the UE and the current access network where the UE is located may be either the identification information described in second embodiment or take any other form.

Step 302: The Serving Gateway judges the information update request to determine that the information update request does not contain indication information of ISR Activation and but derives the identification information for identifying the UE, and information of the current access network where the UE is located from the information update request.

Step 303: The Serving Gateway updates access network information of the UE corresponding to the identification information for identifying the UE, and information of the current access network where the UE is located according to the identification information for identifying the UE, and information of the current access network where the UE is located; or the Serving Gateway assigns a new control plane TEID for the current access network where the UE is located and stores the information of access network corresponding to the new control plane TEID of the current access network where the UE is located and carries the new control plane TEID in a response message. The method is the same as described in second embodiment and will not be detailed here.

Step 304: The Serving Gateway deletes information of other access networks, with which the UE is registered.

Step 305: While taking Step 304, the Serving Gateway may also send an information release request to an appropriate access network to release information relating to other access networks according to the identification information of other access networks, with which the UE is registered.

In this embodiment, the Serving Gateway may also send the information release request to the related access network according to the control plane TEID, which the Serving Gateway assigns to other networks, so as to release information relating to Core Network equipment of other access networks. It may be understood that this step is not necessarily required.

This embodiment provides an ISR deactivation process and a realization of the third embodiment, which may achieve the same effect as the third embodiment.

A Fourth Embodiment

Figure 5:
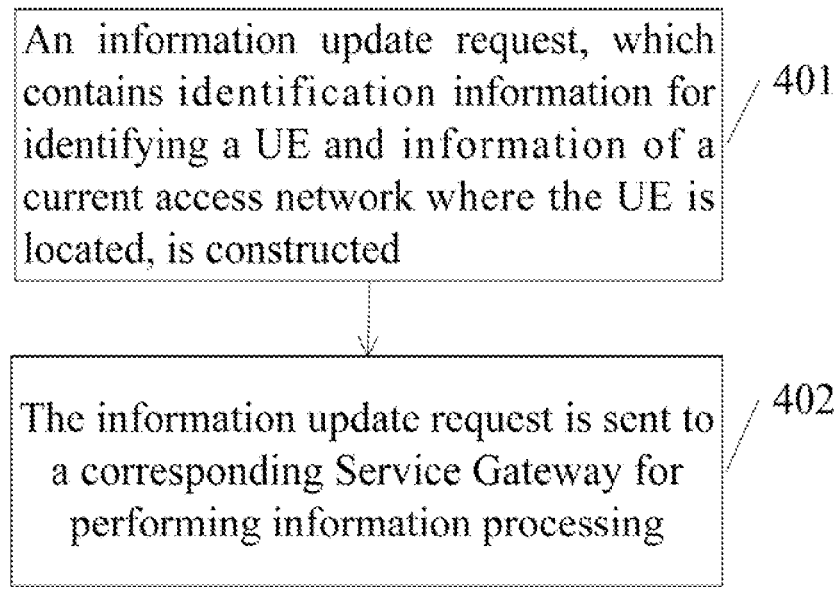
FIG. 5 is a simplified schematic diagram illustrating a method for processing information given Idle-mode Signaling Reduction provided in a fourth embodiment of the present invention.

This embodiment provides a method for processing information given signaling restriction. FIG. 5 shows its flowchart. This method includes the following steps.

Step 401: An information update request, which contains identification information for identifying a UE and information of a current access network where the UE is located, is constructed.

It may be understood that either an MME of are E-UTRAN or an SGSN of a 2G/3G access network may construct the information update request, depending on the current access network where the UE is located.

Step 402: The information update request is sent to a corresponding Serving Gateway for performing information processing.

This embodiment provides a method for processing information given Idle-mode Signaling Reduction on the access network of the UE. In this method, while sending the information update request, the access network of the UE carries identification information for identifying the UE, and information of the current access network where the UE is located. The identification information enables the Serving Gateway to process information of the access network of the UE related to the identification information without affecting the information of other access networks, with which the UE is registered.

A Fifth Embodiment

Figure 6:
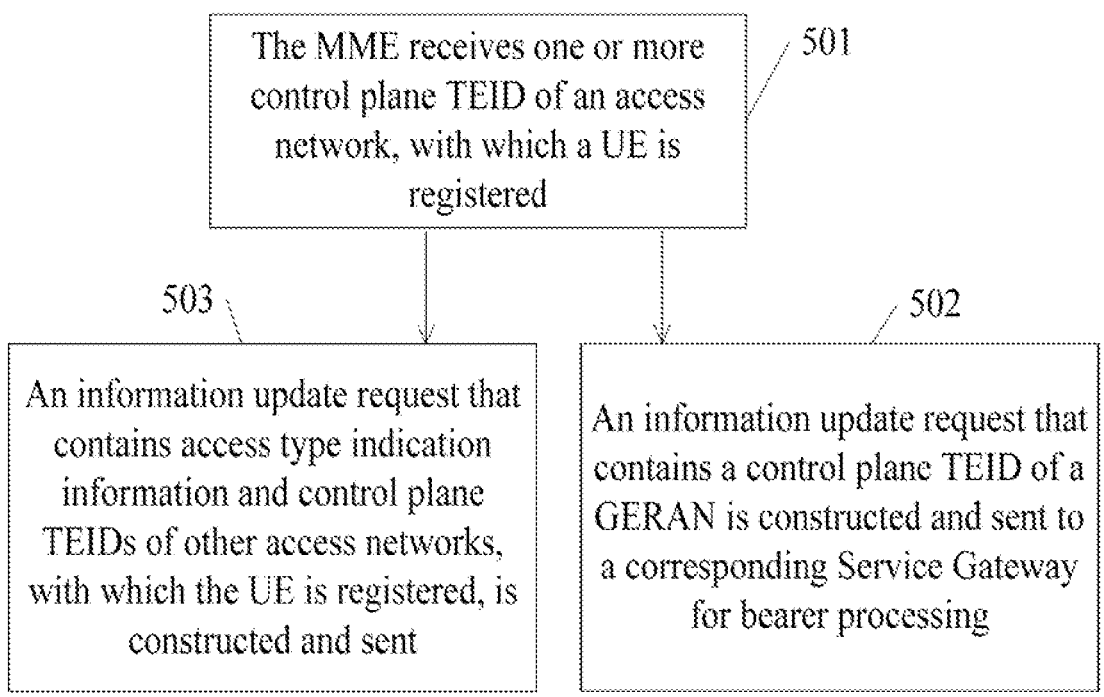
FIG. 6 is a simplified schematic diagram illustrating a method for processing information given Idle-mode Signaling Reduction provided in a fifth embodiment of the present invention.

This embodiment provides a method for processing information given Idle-mode Signaling Reduction and refers to a process initiated by the UE moving to an E-UTRAN. FIG. 6 shows its flowchart. This method includes following steps.

Step 501: An MME receives a control plane TEID of an access network, with which a UE is registered.

When moving to an E-UTRAN or between different areas of the E-UTRAN, the UE sends a TA update request to a relevant MME of the E-UTRAN.

If the UE moves from TA1 to TA2 of the E-UTRAN, the MME of TA2 sends a UE context request to the MME of TA1 according to the TA update request. The MME of TA1 returns a response including UE Context carrying a control plane TEID that the Serving Gateway assigns for TA1.

If the UE moves from a 2G/3G access network to an E-UTRAN, the MME sends a UE context request to an SGSN of the 2G/3G access network according to the TA update request. The SGSN returns a response including UE Context. If the SGSN retains a control plane TEID corresponding to the E-UTRAN where the UE is located, the response including UE Context may carry the control plane TEID of the E-UTRAN. If the SGSN does not retain the control plane TEID, the response including UE Context may carry a control plane TEID that the Serving Gateway assigns for the SGSN.

Step 502: If the control plane TEID of the access network, with which the UE is registered, received by the MME is a control plane TEID of the current access network, namely an E-UTRAN, where the UE is located, an information update request that contains the control plane TEID of the E-UTRAN is constructed and sent to an appropriate Serving Gateway for performing information processing.

It may be understood that the MME may also judge whether the control plane TEID of the E-UTRAN is null. If the control plane TEID of the E-UTRAN is null, it is indicated that the UE moves from another access network to the E-UTRAN for the first time. In this situation, the MME may send an information creation request or an information update request to the appropriate Serving Gateway, requesting the Serving Gateway to assign a new control plane TEID for the MME and store the information relating to the E-UTRAN.

Step 503: If the control plane TEID of the access network, with which the UE is registered, received by the MME is a control plane TEID of another access network, with which the UE is registered, an information update request that contains access type indication information and a control plane TEID of the other access network, with which the UE is registered, is constructed and sent to the appropriate Serving Gateway for performing information processing.

The MME may add the access type indication information into the information update request or use a field that indicates the access type in the information update request repeatedly. For example, the RAT Type field in the information update request is used for charging in existing technology. This embodiment uses the RAT Type field to identify the current access network where the UE is located.

It may be understood that in the forgoing step, if the MME supports the ISR function, the information request sent to the Serving Gateway also contains the indication information of ISR Activation and an activation process given Idle-mode Signaling Reduction is initiated. If the MME does not support the ISR function, the information request does not contain the IRS activation indication and a deactivation process is initiated. Furthermore, Step 502 and Step 503 are not sequential. In other words, Step 502 cannot serve as a trigger condition for Step 503. Step 502 and Step 503 are two branches of Step 501.

This embodiment provides a specific implementation of the fourth embodiment and applies when the MME initiates an information processing flow and a UE moves to an E-UTRAN, thus enabling the Serving Gateway to store or update the E-UTRAN information according to the indication information contained in the information update request without affecting the information relating to other access networks specified in the Serving Gateway. This ensures the UE may communicate properly while in the E-UTRAN.

A Sixth Embodiment

Figure 7:
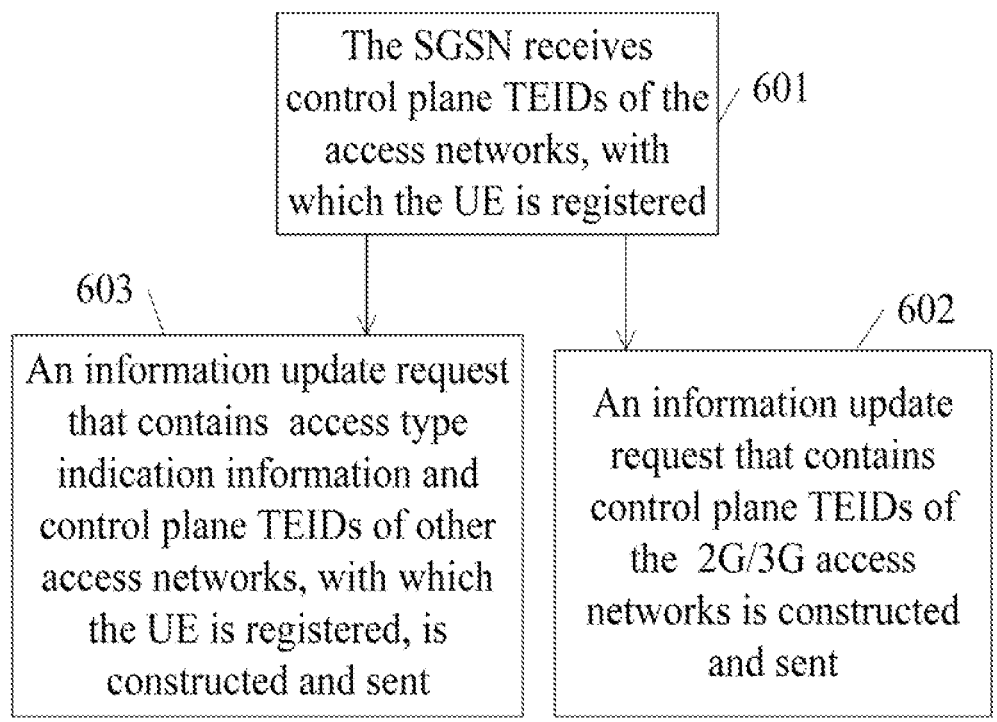
FIG. 7 is a simplified schematic diagram illustrating a method for processing information given Idle-mode Signaling Reduction provided in a sixth embodiment of the present invention.

This embodiment provides a method for processing information given Idle-mode Signaling Reduction and refers to a process initiated by the UE moving to a 2G/3G access network. FIG. 7 shows its flowchart. This method includes the following steps.

Step 601: An SGSN receives a control plane TEID of an access network, with which a UE is registered.

When moving to a 2G/3G access network or between different areas of the 2G/3G network, the UE sends an RA update request to a corresponding SGSN of the 2G/30 network.

If the UE moves from RA1 to RA2 of the 2G/3G access network, the SGSN of RA2 sends a UE context request to the SGSN of RA1 according to the RA update request. The SGSN of RA1 returns a response including UE Context carrying a control plane TEID that the Serving Gateway assigns for RA1.

If the UE moves from an E-UTRAN to a 2G/3G access network, the SGSN sends a UE context request to the MME of the E-UTRAN according to the RA update request. The MME returns a response including UE Context. If the MME retains the control plane TEID of the 2G/3G access network corresponding to the UE, the response including UE Context may carry the control plane TEID of the 2G/3G access network. If the MME does not retain the control plane TEID of the 2G/3G access network corresponding to the UE, the response including UE Context may carry a control plane TEID that the Serving Gateway assigns for the MME.

Step 602: If the SGSN receives a control plane TEID of the access network, with which the UE is registered, and the control plane TEID is the same as the control plane TEID of the current access network, namely a 2G/3G access network, where the UE is located, an information update request that contains the control plane TEID of the 2G/3G access network is constructed and sent to the appropriate Serving Gateway for performing information processing.

It may be understood that the SGSN may also judge whether the control plane TEID of the 2G/3G access network is null. If the control plane TEID of the 2G/3G access network is null, the SGSN may send an information creation request to a appropriate Serving Gateway, requesting the Serving Gateway to assign a control plane TEID for the SGSN and store the relating information of keeping the 2G/3G access network.

Step 603: If the SGSN receives a control plane TEID of the access network, with which the UE is registered, and the control plane TEID is the same as a control plane TEID of another access network, with which the UE is registered, an information update request that contains access type indication information and the control plane TEID of the other access network, with which the UE is registered, is constructed and sent to the appropriate Serving Gateway for information updating.

The SGSN may add the access type indication information to the information update request or continue to use the field that indicates the access type in the information update request. For example, the RAT Type field in the information update request is used for charging in existing technology.

This embodiment uses the RAT Type field to identify the current access network where the UE is located.

It may be understood that in the forgoing step, if the SGSN supports the ISR function, the information request sent to the Serving Gateway also contains the indication information of ISR Activation and an activation process given Idle-mode Signaling Reduction is initiated. If the SGSN does not support the ISR function, the information request sent to the Serving Gateway does not contain the IRS activation indication and a deactivation process is initiated. Furthermore, Step 602 and Step 603 are not sequential. In other words, Step 602 cannot serve as a trigger condition for Step 603. Step 602 and Step 603 are two branches of Step 601.

This embodiment provides another specific implementation of the fourth embodiment and applies when the SGSN initiates an information processing flow and a UE moves to a 2G/3G access network, thus enabling the Serving Gateway to store or update the 2G/3G access network information according to the indication information contained in the information update request without affecting the information relating to other access networks specified in the Serving Gateway. This ensures the UE may communicate properly while in the 2G/3G access network.

A Seventh Embodiment

This embodiment provides a method for processing information given Idle-mode Signaling Reduction. As discussed in the preceding embodiments, when the control plane TEID of the current access network where the UE is located is used to identify the UE and the current access network where the UE is located, the service network needs to assign a appropriate control plane TEID for the current access network where the UE is located, thus enabling the control plane TEID of the current access network where the UE is located not only to identify the UE but also to identify the current access network where the UE is located. To achieve the purpose, the Serving Gateway may take the following steps.

The Serving Gateway receives an information creation request that contains indication information used for indicating a current access network where a UE is located.

The Serving Gateway assigns an appropriate control plane TEID for the current access network where the UE is located according to the indication information in the information creation request used for indicating the current access network where the UE is located.

The Serving Gateway stores information relating to the current access network where the UE is located.

It may be understood that the identification information for identifying the current access network where the UE is located may take a form as described in the preceding embodiment or any other form without limiting the generality of the present prevention.

An Eighth Embodiment

This embodiment provides a method for processing information given Idle-mode Signaling Reduction, including:

receiving, by a Serving Gateway, an information release request, which contains access type indication information and information release requests of other access networks; and releasing, by the Serving Gateway, a UE control plane TEID.

The method for processing information given Idle-mode Signaling Reduction provided in the embodiment applies to the Serving Gateway relating to the current access network where the UE is located when the UE is prepared to quit all access networks. When the UE initiates a detach process to current access network where the UE is located, the current access network sends an information release request to an appropriate Serving Gateway.

In this embodiment, after receiving the information release request from the current access network where the UE is located, the Serving Gateway finds that it only stores one control plane TEID of the UE and the control plane TEID fails to indicate the type of the access network of the UE, the Serving Gateway does not release the control plane TEID until the Serving Gateway receives an information release request from another access network, with which the UE is registered. The present embodiment corrects system errors that occur when a Serving Gateway used in existing technology releases the control plane TEID upon receiving an information release request from the current access network where the UE is located.

A Ninth Embodiment

Figure 8:
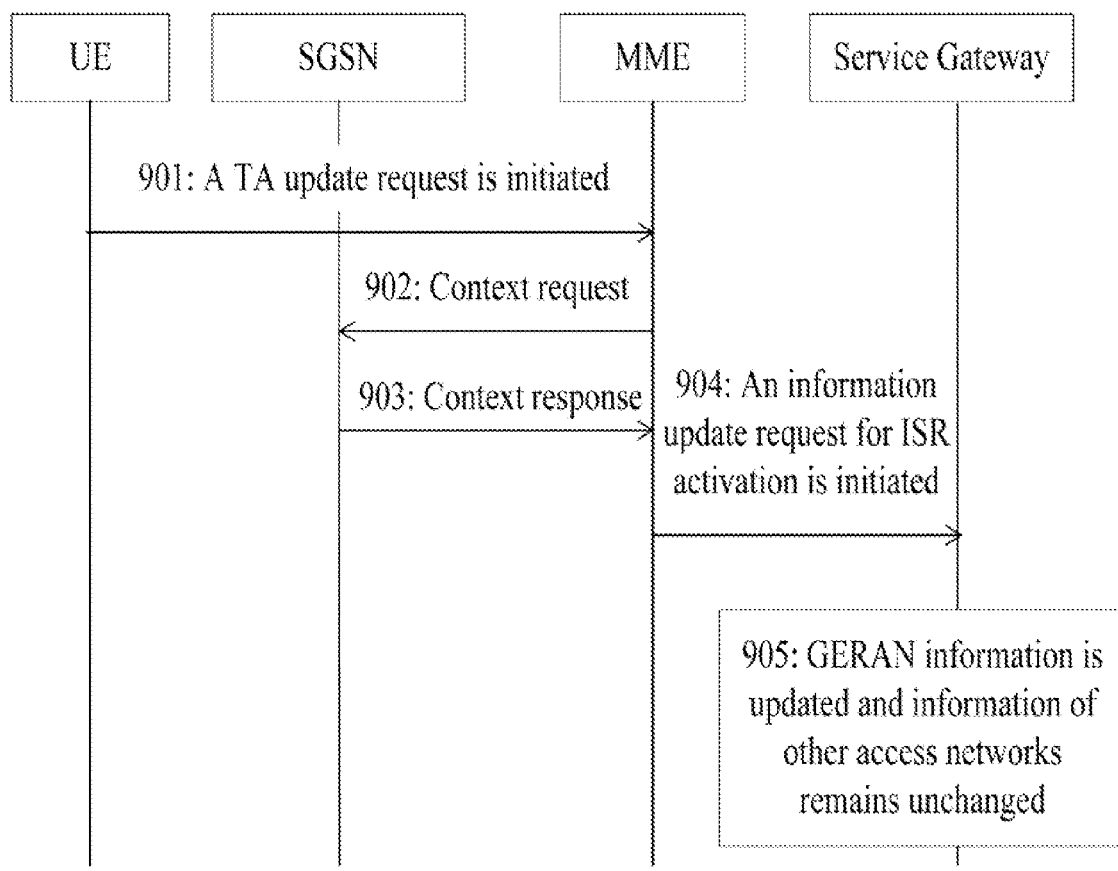
FIG. 8 is a simplified schematic diagram illustrating a method for processing information given Idle-mode Signaling Reduction provided in a ninth embodiment of the present invention.

This embodiment provides a method for processing information given Idle-mode Signaling Reduction and refers to a specific application of the preceding embodiment given restrictions on signaling activation. In this embodiment, the UE moves from a 2G/3G access network to an E-UTRAN, with which the UE has been registered. Furthermore, the MME of the E-UTRAN supports the ISR function. FIG. 8 shows the flowchart. This method includes the following steps.

Step 901: A UE sends a TA update request to an MME.

Step 902: The MME sends a UE context request to an SGSN according to the TA update request.

Step 903: The SGSN queries context it has stored according to the UE context request, and returns an appropriate context response to the MME.

It may be understood that when the SGSN stores one control plane TEID of a UE, the returned context response may carry a control plane TEID of the UE; and that when the SGSN stores both a control plane TEID of a 2G/3G access network and a control plane TEID of an E-UTRAN of the UE, the returned context response may further carry a control plane TEID of the E-UTRAN.

The context response returned to the MME may also further carry an SGSN type indication, to indicate that the previous access network where the UE is located is a 2G/3G access network.

Step 904: Upon receiving the context response, the MME sends an information update request to an appropriate Serving Gateway according to the control plane TEID contained in the context response.

If the context response carries the control plane TEID of the E-UTRAN of the UE, an information update request that contains the indication information of ISR Activation and the control plane TEID of the E-UTRAN may be constructed and sent to the Serving Gateway; if the context response carries the control plane TEID of the 2G/3G access network of the UE, an information update request that contains the indication information of ISR Activation, access type indication information and the control plane TEID of the 2G/3G access network may be constructed and sent to the Serving Gateway.

Step 905: According to the information update request, the Serving Gateway updates the information relating to the E-UTRAN, with which the UE is registered. Such relating information includes the control plane address of the MME stored locally. The relating information of the 2G/3G access network is kept unchanged.

A Tenth Embodiment

Figure 9:
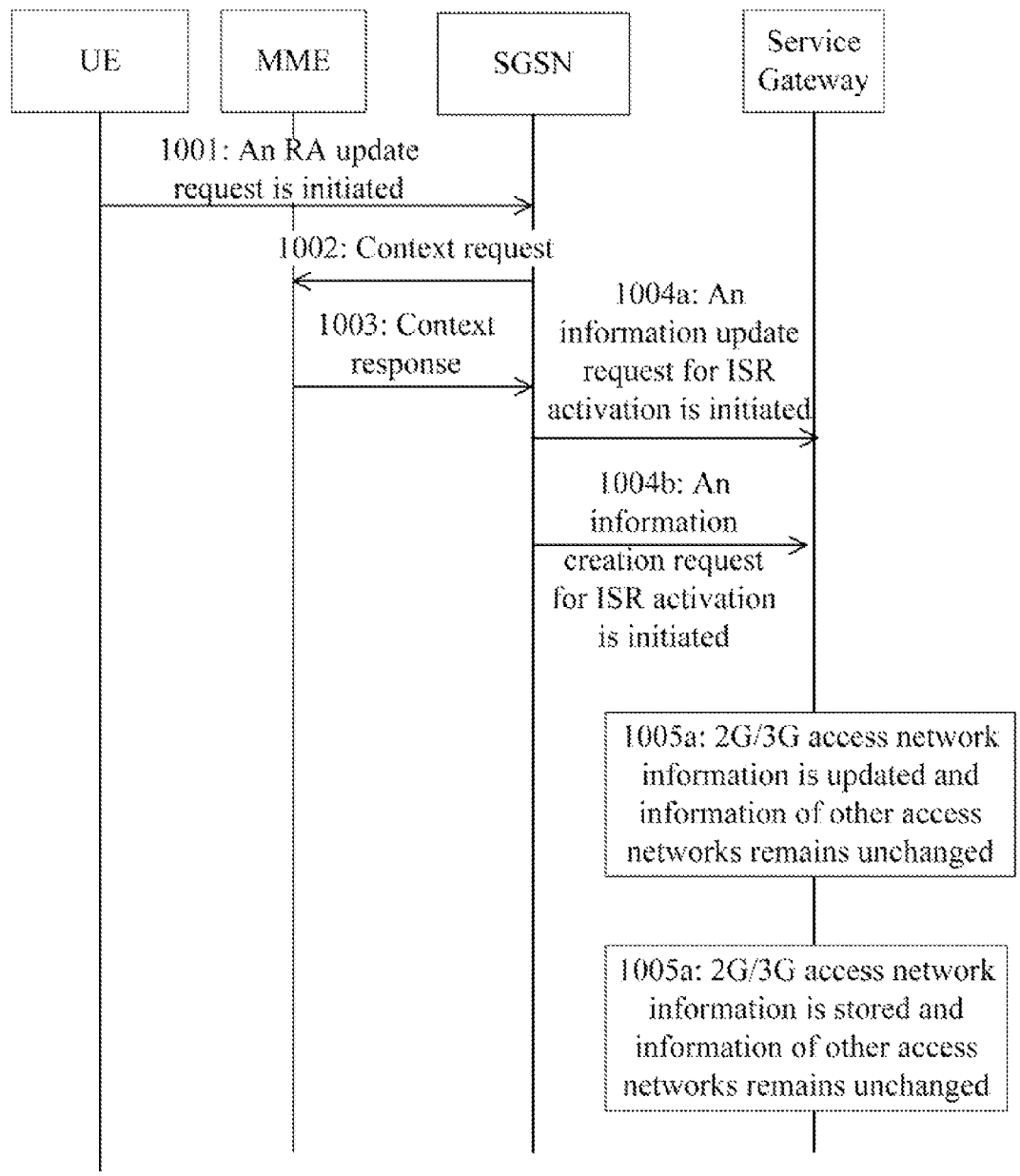
FIG. 9 is a simplified schematic diagram illustrating a method for processing information given Idle-mode Signaling Reduction provided in a tenth embodiment of the present invention.

This embodiment provides a method for processing information given Idle-mode Signaling Reduction and refers to a specific application of the preceding embodiments given restrictions on signaling activation. In this embodiment, the UE moves from an E-UTRAN to a 2G/3G access network, and an SGSN of the 2G/3G access network supports ISR. FIG. 9 shows the flowchart. This method includes the following steps.

Step 1001: A UE sends an RA update request to an SGSN.

Step 1002: The SGSN sends a UE context request to an MME according to the RA update request.

Step 1003: The MME queries the context it has stored according to the UE context request, and returns an appropriate context response to the SGSN.

It may be understood that when the MME stores one control plane TEID of a UE, the returned context response may carry a control plane TEID of the UE; and that when the MME stores both a control plane TEID of the 2G/3G access network and a control plane TEID of the E-UTRAN of the UE, the returned context response may further carry the control plane TEID of the 2G/3G access network.

The context response returned to the SGSN may also further carry an MME type indication, to indicate that the previous access network where the UE is located is an E-UTRAN.

Step 1004a: Upon receiving the context response, the SGSN sends an information update request to an appropriate Serving Gateway according to the control plane TEID contained in the response.

If the context response carries the control plane TEID that the 2G/3G access network assigns for the UE and the control plane TEID of the 2G/3G access network is null, an information update request that contains indication information of ISR Activation and the control plane TEID of the 2G/3G access network may be constructed and sent to a Serving Gateway or Step 1004b is performed; if the context response carries the control plane TEID of the E-UTRAN of the UE, an information update request that contains indication information of ISR Activation, access type indication information and the control plane TEID of the E-UTRAN may be constructed and sent to the Serving Gateway.

Step 1004b: The SGSN sends an information creation request that contains indication information of ISR Activation and access type indication information to the appropriate Serving Gateway.

Step 1005a: Upon receiving the information update request, the Serving Gateway checks information carried in itself according to the identification information for identifying the current access network (namely 2G/3G access network) where the UE is located. If the Serving Gateway does not carry information relating to the 2G/3G access network, Step 1005b is preformed; if the Serving Gateway carries information relating to the 2G/3G access network, the information relating to the 2G/3G network of the UE is updated. Such information relating to the 2G/3G network of the UE includes the control plane address of the SGSN, RNC user plane address and TEID contained in the information context, and the information relating to the E-UTRAN of the UE remains unchanged; if the Serving Gateway receives the information creation request, Step 1005b is preformed.

Step 1005b: The Serving Gateway stores information relating to the 2G/3G access network according to the 2G/3G access network indication carried in the information creation request or information update request and keeps the E-UTRAN information unchanged.

An Eleventh Embodiment

Figure 10:
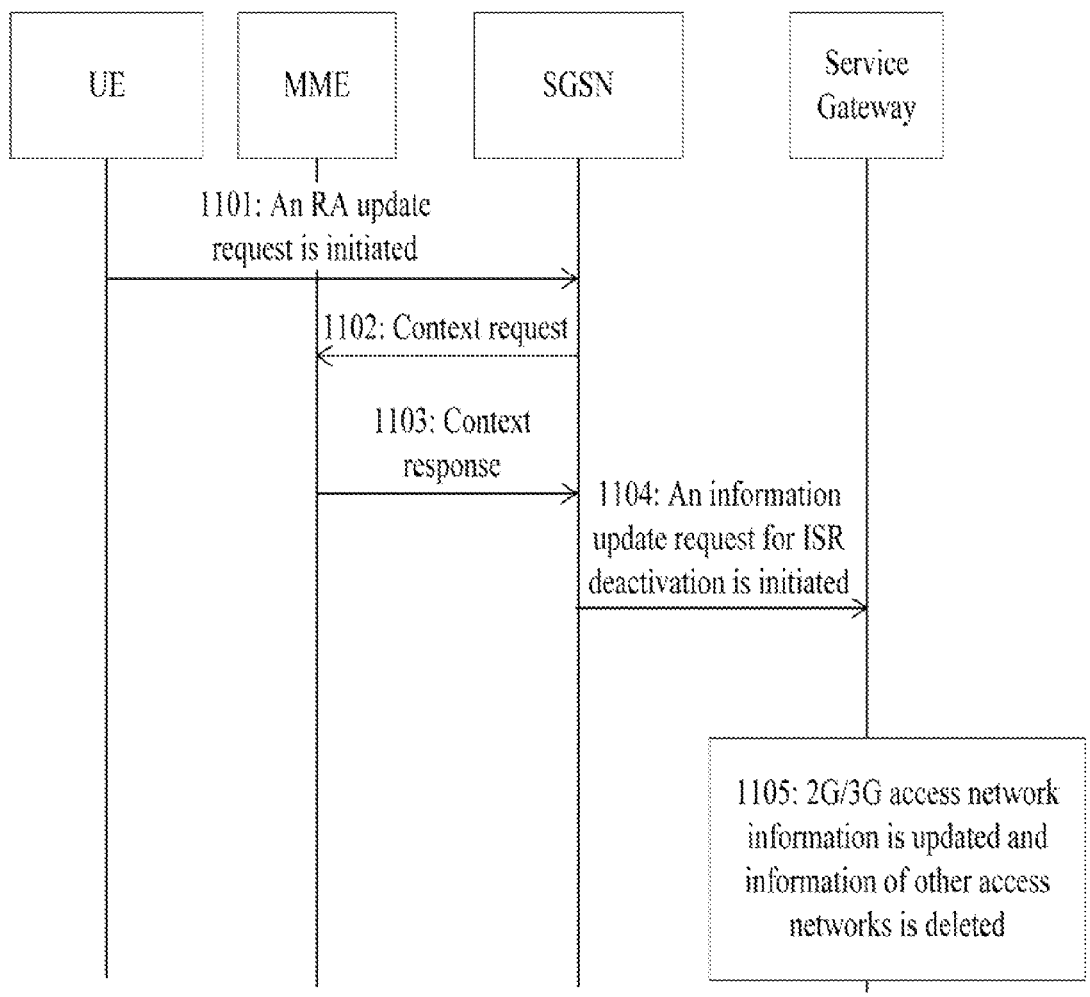
FIG. 10 is a simplified schematic diagram illustrating a method for processing information given Idle-mode Signaling Reduction provided in an eleventh embodiment of the present invention.

This embodiment provides a method for processing information given Idle-mode Signaling Reduction and refers to a specific application of the preceding embodiment given restrictions on signaling deactivation. In this embodiment, the UE moves from an E-UTRAN to a UE-registered 2G/3G access network, and the SGSN of the E-UTRAN does not support ISR function. FIG. 10 shows the signaling flowchart. This method includes the following steps.

Step 1101: A UE sends an RA update request to an SGSN.

Step 1102: The SGSN sends a UE context request to an MME according to the RA update request.

Step 1103: The MME queries a context it has saved according to the UE context request, and returns an appropriate context response to the SGSN.

It may be understood that when the MME stores one control plane TEID of the UE, the returned context response may carry a control plane TEID of the UE; and that when the MME stores both a control plane TEID of the 2G/3G access network and a control plane TEID of the E-UTRAN of the UE, the returned context response may further carry the control plane TEID of the 2G/3G access network.

Step 1104: Upon receiving the context response, the SGSN sends an information update request for deactivation to the appropriate Serving Gateway according to the control plane TEID contained in the context response.

If the context response carries the control plane TEID of the 2G/3G access network of the UE, an information update request for deactivation that contains the control plane TEID of the 2G/3G access network may be constructed and sent to the Serving Gateway; if the context response carries the control plane TEID of the E-UTRAN of the UE, an information update request for deactivation that contains access type indication information and the control plane TEID of the E-UTRAN may be constructed and sent to the Serving Gateway.

Step 1105: The Serving Gateway updates the relating information of keeping the 2G/3G access network of the UE according to the information update request for deactivation. Such the relating information of keeping the 2G/3G access network of the UE includes the control plane address of the SGSN, RNC user plane address and TEID carried in the information context. Further, the Serving Gateway deletes information relating to other access networks of the UE, such as the E-UTRAN.

A Twelfth Embodiment

Figure 11:
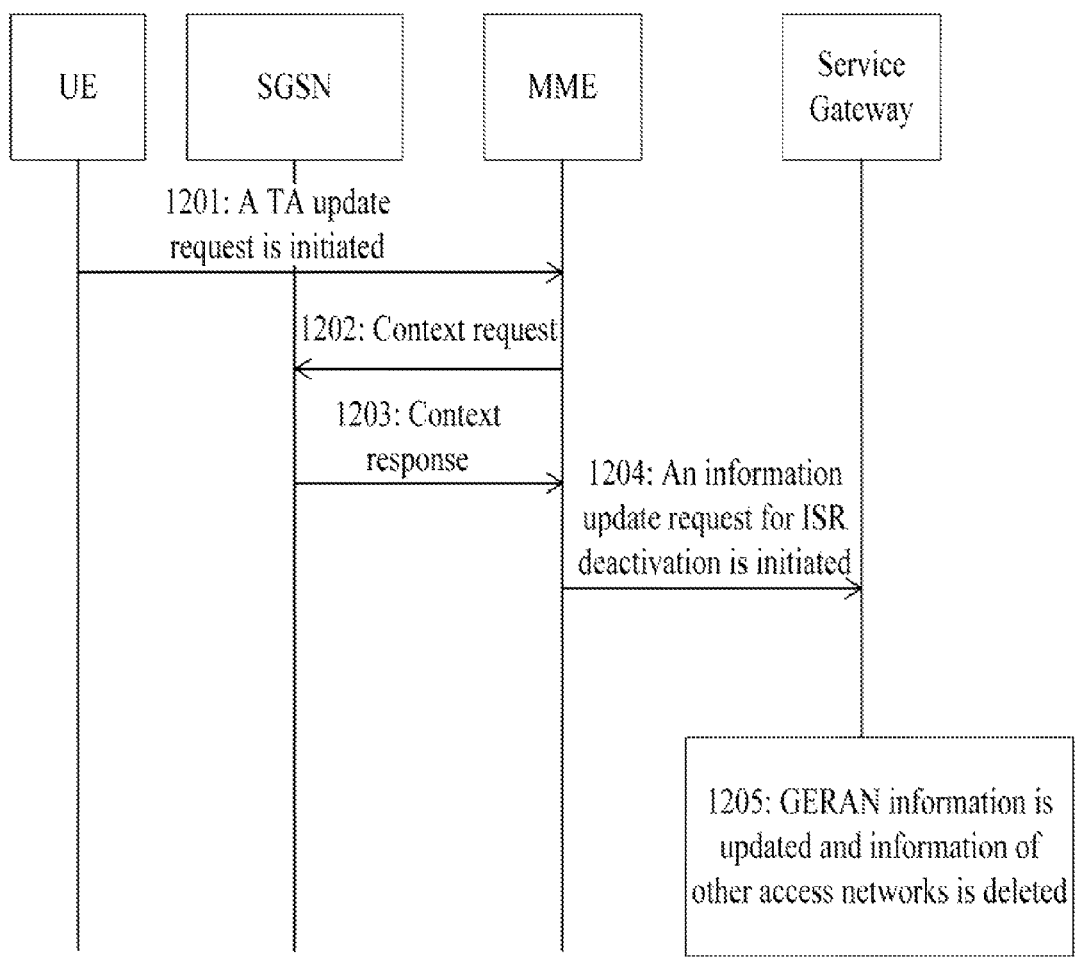
FIG. 11 is a simplified schematic diagram illustrating a method for processing information given Idle-mode Signaling Reduction provided in a twelfth embodiment of the present invention.

This embodiment provides a method for processing information given Idle-mode Signaling Reduction and refers to a specific application of the preceding embodiment given restrictions on signaling deactivation. In this embodiment, the UE moves from a 2G/3G access network to an E-UTRAN, with which the UE has been registered. Furthermore, the MME of the E-UTRAN does not support the ISR function. FIG. 11 shows the flowchart. This method includes the following steps.

Step 1201: A UE sends a TA update request to an MME.

Step 1202: The MME sends a UE context request to an SGSN according to the TA update request.

Step 1203: The SGSN queries the context it has stored according to the UE context request, and returns an appropriate context response to the MME.

It may be understood that when the SGSN stores one control plane TEID for a UE, the returned context response may carry a control plane TEID of the UE; and that when the SGSN stores both a control plane TEID of the 2G/3G access network and a control plane TEID of the E-UTRAN of the UE, the returned context response may further carry the control plane TEID of the E-UTRAN.

The context response returned to the MME may also further carry an SGSN type indication, to indicate that the previous access network, where the UE has been located, is a 2G/3G access network.

Step 1204: Upon receiving the context response, the MME sends an information update request for deactivation to an appropriate Serving Gateway according to the control plane TEID contained in the context response.

If the context response carries the control plane TEID of the E-UTRAN of the UE, an information update request for deactivation that contains the control plane TEID of the E-UTRAN may be constructed and sent to the Serving Gateway; if the context response carries the control plane TEID of the 2G/3G access network of the UE, an information update request for deactivation that contains access type indication information and the control plane TEID of the 2G/3G access network may be constructed and sent to the Serving Gateway.

Step 1205: The Serving Gateway updates the information relating to the E-UTRAN of the UE according to the information update request for deactivation. Such the information relating to the E-UTRAN of the UE includes the control plane address of the MME and the relating information of keeping the 2G/3G access network.

A Thirteenth Embodiment

Figure 12:
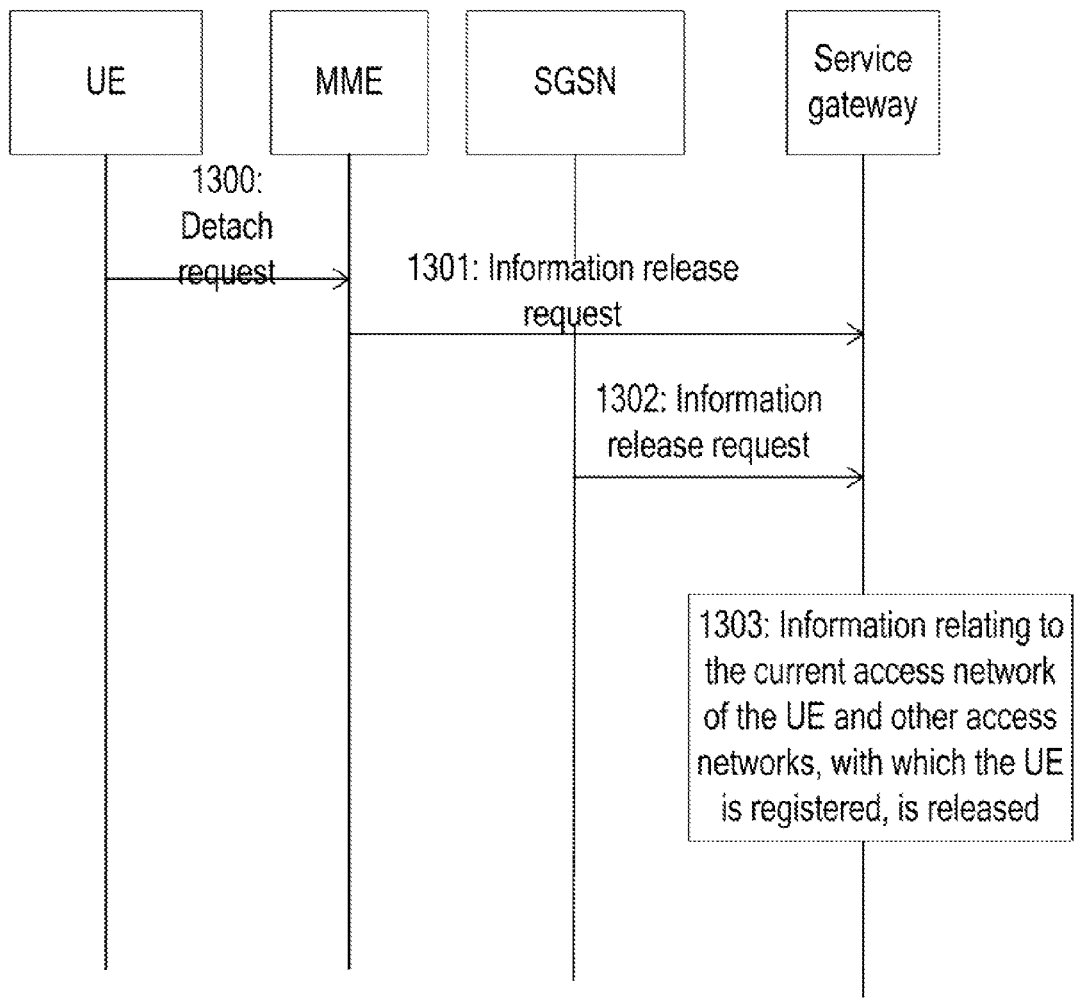
FIG. 12 is a simplified schematic diagram illustrating a method for processing information given Idle-mode Signaling Reduction provided in a thirteenth embodiment of the present invention.

This embodiment provides a method for processing information given Idle-mode Signaling Reduction and refers to a specific application of detaching a UE. In this embodiment, the UE is detached from an E-UTRAN. This embodiment applies when the Serving Gateway assigns a same identical control plane TEID for the access networks, with which the UE is registered. FIG. 12 shows the signaling flowchart. This method includes the following steps.

Step 1300: A UE sends a detach request to an MME.

Step 1301: According to the detach request, the MME sends an information release request that carries access type indication information to an appropriate Serving Gateway.

Step 1302: Upon receiving the information release request, according to the access type indication information carried in the information release request, the Serving Gateway finds that in the information it carries, the control plane TEIDs of the access networks, with which the UE is registered, are identical. The Serving Gateway does not release the UE information and waits for an information release request from other access networks, with which the UE is registered, such as SGSN.

Step 1303: The Serving Gateway receives an information release request from the access networks, with which the UE is registered, and releases the information of the access networks.

Figure 13:
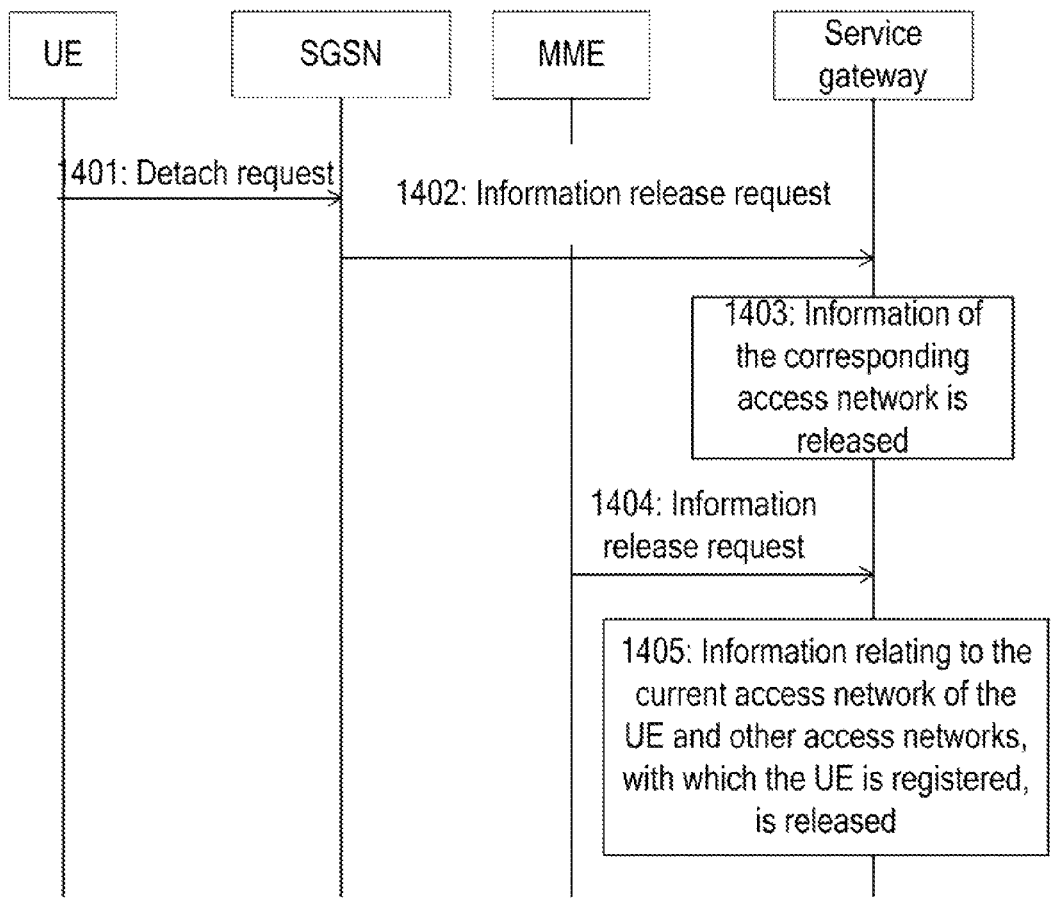
FIG. 13 is a simplified schematic diagram illustrating a method for processing information given Idle-mode Signaling Reduction provided in a fourteenth embodiment of the present invention.

A fourteenth embodiment provides a method for processing information given Idle-mode Signaling Reduction and refers to a specific application of detaching a UE. In this embodiment, the UE is detached from a 2G/3G access network. This embodiment applies when the Serving Gateway assigns different control plane TEIDs for the access networks, with which the UE is registered. FIG. 13 shows the signaling flowchart. This method includes the following steps.

Step 1401: A UE sends a detach request to an SGSN.

Step 1402: According to the detach request, the SGSN sends an information release request that carries access type indication information to an appropriate Serving Gateway.

Step 1403: Upon receiving the information release request, according to the access type indication information carried in the information release request, the Serving Gateway finds that in the information it carries, the control plane TEIDs for the access networks, with which the UE is registered, are different. The Serving Gateway releases the information of the access network indicated by the access type indication information.

Step 1404: An MME sends an information release request that carries the access type indication information to the appropriate Serving Gateway.

Step 1405: Upon receiving the information release request, according to the access type indication information, the Serving Gateway finds that in the information it carries, the control plane TEIDs for the access networks, with which the UE is registered, are different. The Serving Gateway releases information of the access network indicated by the access type indication information.

It is understandable to those skilled in this art that all or part of the steps described in the methods set forth in the foregoing embodiments may be implemented by a program giving instructions to related hardware. The program may be stored in computer readable storage media. Such storage media includes Read-only Memory (ROM), Random Access Memory (RAM), disks or compact discs.

A First Device Embodiment

Figure 14:
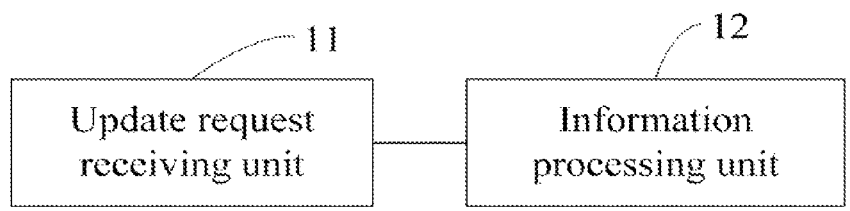
FIG. 14 is a simplified schematic diagram illustrating a structure of the Serving Gateway of a device provided in the first embodiment of the present invention.

This embodiment provides a Serving Gateway, whose simplified schematic diagram of the structure is shown in FIG. 14, including: an update request receiving unit 11 and an information processing unit 12.

The update request receiving unit 11 is configured to receive an information update request, which contains identification information for identifying a UE, and information of a current access network where the UE is located.

The information processing unit 12 is configured to process information relating to an access network, with which a UE is registered, according to the information update request received by the update request receiving unit 11 and the identification information for identifying the UE and the information of the current access network where the UE is located, contained in the information update request.

In the present embodiment, the information request processing unit 12 of the Serving Gateway, according to the identification information contained in the information update request received by the upon request receiving unit 11, processes the information relating to the access network of the appropriate UE. This does not affect the information relating to other access networks, with which the UE is registered, thus rectifying the defect that an existing Serving Gateway cannot process related information properly and ensuring that the UE may communicate while moving between access networks.

A Second Device Embodiment

Figure 15:
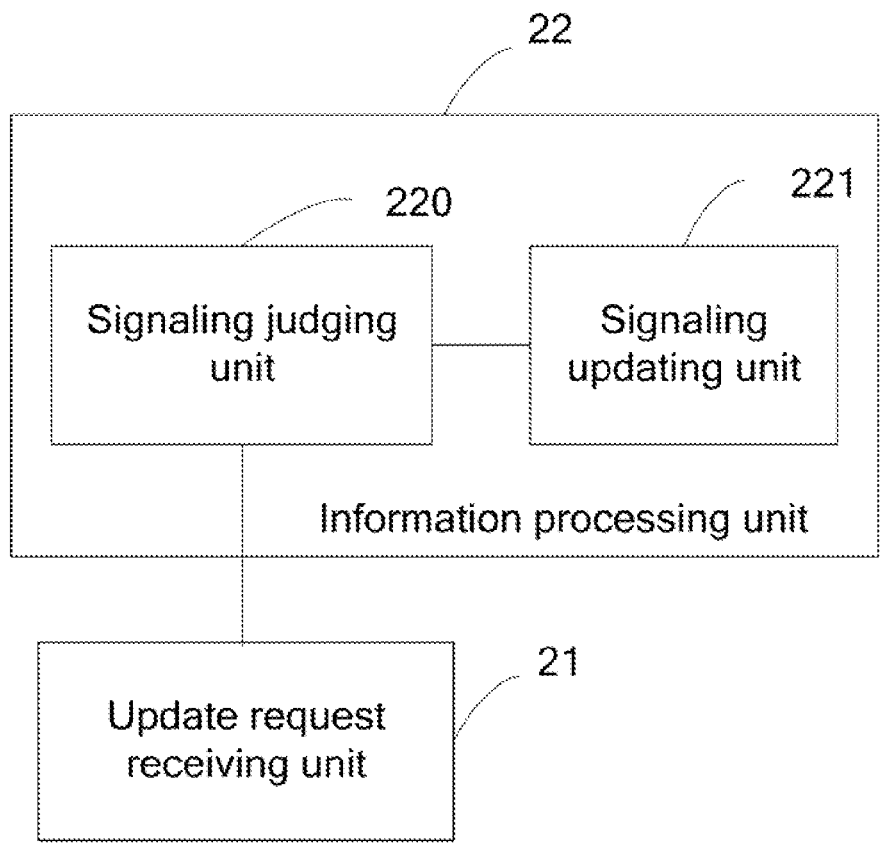
FIG. 15 is a simplified schematic diagram illustrating a structure of the Serving Gateway of a device provided in the second embodiment of the present invention.

This embodiment provides a Serving Gateway, whose simplified schematic diagram of the structure is shown in FIG. 15, including: an update request receiving unit 21 and an information processing unit 22.

The update request receiving unit 21 is configured to receive an information update request, which contains identification information for identifying a UE, and information of a current access network where the UE is located.

The information processing unit 22 is configured to process information relating to an access network, with which a UE is registered, according to the information update request received by the update request receiving unit 21 and the identification information for identifying the UE and the information of the current access network where the UE is located, contained in the information update request.

It is understandable that the information processing unit 22 may further include a signaling judging unit 220 and an information update unit 221. The signaling judging unit 220 is configured to judge whether the information update request received by the update request receiving unit 31 contains indication information of ISR Activation. The information update unit 221 is configured to update or store information of the current access network where the UE is located corresponding to the identification information for identifying the UE, and information of the current access network where the UE is located, wherein the identification information is contained in the information update request, if the signaling judging unit 220 judges that the information update request contains the indication information of ISR Activation.

Based on the first device embodiment, in this present embodiment, the information processing unit 22 described in device first embodiment is enhanced, enabling the Serving Gateway to process the information relating to the access network of the appropriate UE depending on whether the information update request received by the update request receiving unit 21 contains the indication of ISR Activation.

A Third Device Embodiment

Figure 16:
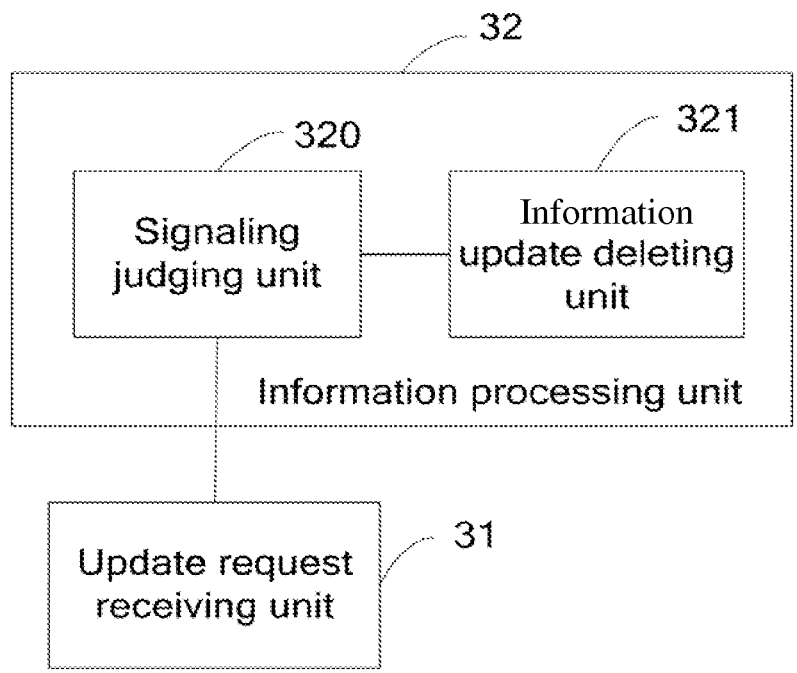
FIG. 16 is a simplified schematic diagram illustrating a structure of the Serving Gateway of a device provided in the third embodiment of the present invention.

This embodiment provides a Serving Gateway, whose simplified schematic diagram of the structure is shown in FIG. 16, including: an update request receiving unit 31 and an information processing unit 32.

The update request receiving unit 31 is configured to receive an information update request, which contains identification information for identifying a UE, and information of a current access network where the UE is located.

The information processing unit 32 is configured to process information relating to an access network, with which a UE is registered, according to the information update request received by the update request receiving unit 31 and the identification information for identifying the UE and the information of the current access network where the UE is located, contained in the information update request.

It is understandable that information processing unit 32 may further include a signaling judging unit 320 and an update deleting unit 321. The signaling judging unit 320 is configured to judge whether the information update request received by the update request receiving unit 31 contains indication information of ISR Activation. The information update deleting unit 321 is configured to update or store information of the current access network where the UE is located corresponding to the identification information for identifying the UE, and information of the current access network where the UE is located, wherein the identification information is contained in the information update request and delete information relating to another access network, with which the UE is registered, if the signaling judging unit 320 judges that the information update request does not contain the indication information of ISR Activation.

In this present embodiment, the information processing unit 32 described in the first device embodiment is enhanced, enabling the Serving Gateway to process the information relating to the access network of the appropriate UE depending on whether the information update request received by the update request receiving unit 31 contains the indication of ISR Activation.

A Fourth Device Embodiment

Figure 17:
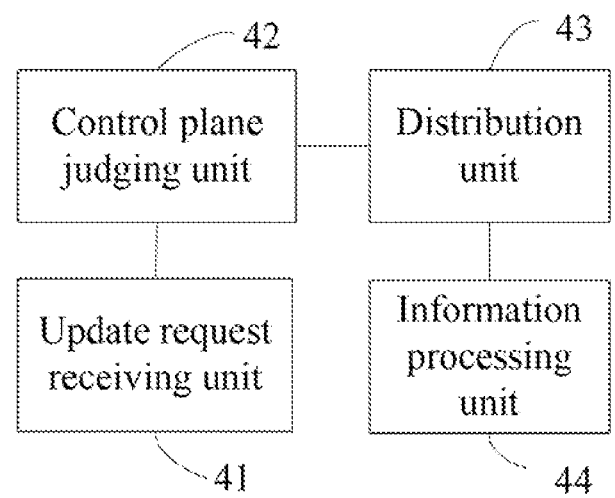
FIG. 17 is a simplified schematic diagram illustrating a structure of the Serving Gateway of a device provided in the fourth embodiment of the present invention.

This embodiment provides a Serving Gateway, whose simplified schematic diagram of the structure is shown in FIG. 17, including: an update request receiving unit 41, a control plane judging unit 42, a distribution unit 43 and an information processing unit 44.

The update request receiving unit 41 is configured to receive an information update request, which contains identification information for identifying a UE, and information of a current access network where the UE is located.

The control plane judging unit 42 is configured to determine whether a control plane TEID relating to the current access network where the UE is located is null when the information update request received by the update request receiving unit 41 contains the control plane TEID relating to the current access network where the UE is located.

The distribution unit 43 is configured to assign a corresponding new control plane TEID for the current access network where the UE is located when the control plane judging unit 42 determines that the control plane TEID relating to the current access network where the UE is located is null.

The information processing unit 44 is configured to store information of the current access network where the UE is located corresponding to the new control plane TEID assigned by unit 43.

A Fifth Device Embodiment

Figure 18:
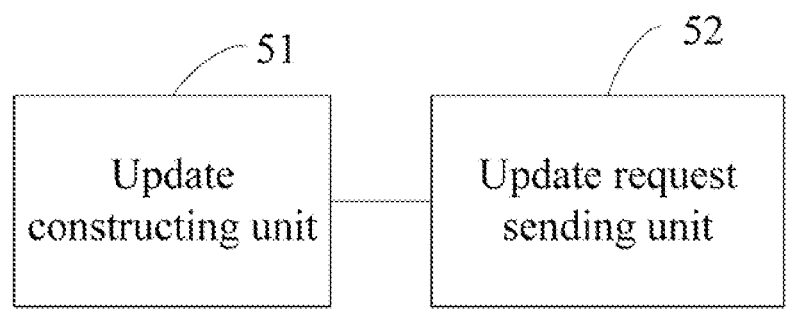
FIG. 18 is a simplified schematic diagram illustrating a structure of the mobility management entity of a device provided in the fifth embodiment of the present invention.

This embodiment provides an MME, whose simplified schematic diagram of the structure is shown in FIG. 18, including: an update constructing unit 51 and an update request sending unit 52.

The update constructing unit 51 is configured to construct an information update request, which contains identification information for identifying a UE, and information of a current access network where the UE is located.

The update request sending unit 52 is configured to send the information update requests constructed by the update constructing unit 51 to a corresponding Serving Gateway for performing information processing.

In the present embodiment, the update request sending unit 52 of the MME sends the information update requests constructed by the update constructing unit 51 to the appropriate Serving Gateway, enabling the Serving Gateway to process the information relating to the access network, with which the UE is registered, according to the identification information contained in the received information update request. This does not affect the information relating to other access networks, with which the UE is registered, thus rectifying the defect that an existing Serving Gateway cannot process related information properly and ensuring that the UE may communicate while moving between access networks.

A Sixth Device Embodiment

Figure 19:
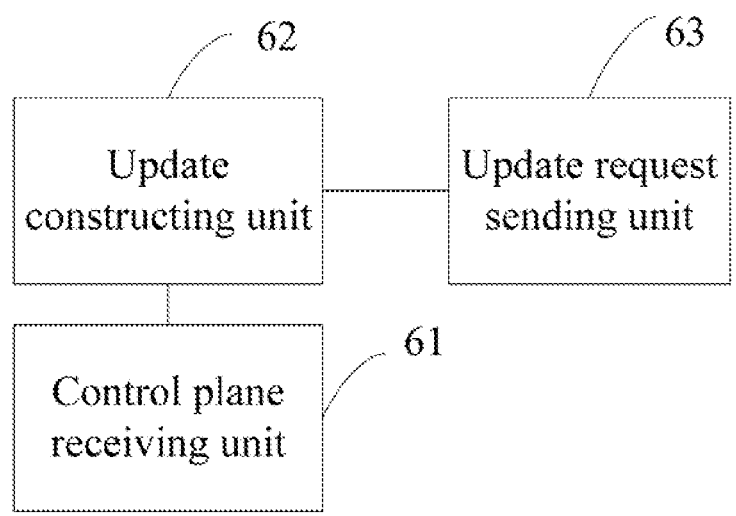
FIG. 19 is a simplified schematic diagram illustrating a structure of the mobility management entity of a device provided in the sixth embodiment of the present invention.

This embodiment provides an MME, whose simplified schematic diagram of the structure is shown in FIG. 19, including: a control plane receiving unit 61, an update constructing unit 62 and an update request sending unit 63.

The control plane receiving unit 61 is configured to receive a control plane TEID of an access network, with which a UE is registered.

The update constructing unit 62 is configured to construct an information update request that contains a control plane TEID corresponding to the current access network where the UE is located and transfer the information update request to the update request sending unit 63 if the control plane TEID of the access network, with which the UE is registered, received by the control plane receiving unit 61 is the same as the control plane TEID of the current access network where the UE is located. The update constructing unit 62 is further configured to construct an information update request that contains access type indication information and control plane TEID of another access network with which the UE is registered and transfer the information update request to the update request sending unit 63 if the control plane TEID of the access network, with which the UE is registered, received by the control plane receiving unit 61 is the same as the control plane TEID of the other current access network, with which the UE is registered.

The update request sending unit 63 is configured to send the information update request constructed by the update constructing unit 62 to a corresponding Serving Gateway for performing information processing.

The control plane receiving unit 61 is added to the present embodiment based on the fifth device embodiment. This enables the MME to construct the information update request containing the identification information for identifying the UE, and information of the current access network where the UE is located according to the control plane TEID in the control plane receiving unit 61.

A Seventh Device Embodiment

Figure 20:
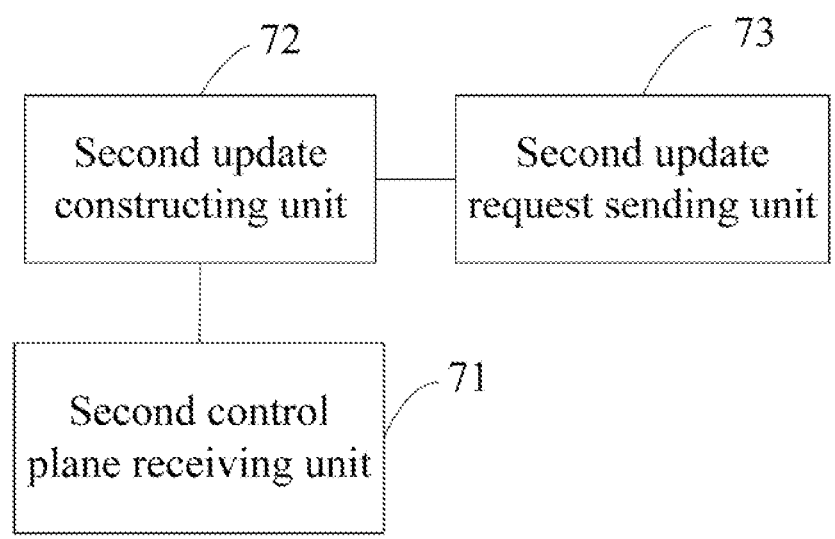
FIG. 20 is a simplified schematic diagram illustrating a structure of the SGSN of a device provided in the seventh embodiment of the present invention.

This embodiment provides an SGSN, whose simplified schematic diagram of the structure is shown in FIG. 20, including: a second control plane receiving unit 71, a second update constructing unit 72 and a second update request sending unit 73.

The second control plane receiving unit 71 is configured to receive a control plane TEID of an access network with which a UE is registered.

The second update constructing unit 72 is configured to construct an information update request that contains a control plane TEID corresponding to a current access network where the UE is located and transfer the information update request to the second update request sending unit 73 if the control plane TEID of the access network, with which the UE is registered, received by the second control plane receiving unit 71 is the same as the control plane TEID of the current access network where the UE is located. The second update constructing unit 72 is further configured to construct an information update request that contains access type indication information and a control plane TEID of another access network with which the UE is registered and transfer the information update request to the second update request sending unit 73 if the control plane TEID of the access network, with which the UE is registered, received by the second control plane receiving unit 71 is the same as the control plane TEID of the other current access network, with which the UE is registered.

The second update request sending unit 73 is configured to send the information update requests constructed by the second update constructing unit 72 to a corresponding Serving Gateway for performing information processing.

The methods for processing information and related devices given Idle-mode Signaling Reduction provided in the present invention reveal that given Idle-mode Signaling Reduction, the Serving Gateway carries the information relating to two access networks, with which a UE is registered. When the UE moves between different access networks or within different areas of the same access network, after receiving an information update request, the Serving Gateway may process the information relating to the access network of the UE according to the information update request and the identification information for identifying the UE and the information of the current access network where the UE is located contained in the information update request, without affecting the information of other access networks, with which the UE is registered. The method corrects system errors that occur when a Serving Gateway does not know which access network's information it should process given Idle-mode Signaling Reduction in existing technology, so as to guarantee communication when a UE moves between access networks specified in the Serving Gateway information given Idle-mode Signaling Reduction.

Accordingly, given Idle-mode Signaling Reduction, when a UE quits the access network with which the UE is registered, that is, detaching the UE, a Serving Gateway needs to release control plane TEIDs assigned for access networks, with which the UE is registered. If the Serving Gateway assigns the same control plane TEID for these access networks with which the UE is registered, the Serving Gateway usually releases the control plane TEID till the Serving Gateway receives an information release request from the current access network where the UE is located and other access networks. This ensures that no error occurs when the UE quits an access network, with which it is registered.

Detailed above are information processing methods and related devices given Idle-mode Signaling Reduction provided in the embodiments of the present invention. This document explains the principles and embodiments of the present invention only for the purpose of facilitating understanding of the methods and teachings set forth herein. It is apparent that those skilled in the art may make various modifications and variations to the invention in terms of specific implementation and scope of application based on the teachings conveyed herein. In conclusion, identification information contained in this document shall in no event be construed to limit the scope of the present invention.

What is claimed is:

1. A method for processing information given idle-mode signaling reduction (ISR), comprising:

receiving, by a serving gateway, an information update request containing identification information for identifying a user equipment (UE) and information of a current access network where the UE is located from one of a mobility management entity (MME) and serving general packet radio service (GPRS) support node (SGSN); and processing, by the serving gateway, information relating to an access network with which the UE is registered, according to the identification information for identifying the UE, and information of the current access network where the UE is located.

2. The method of claim 1, wherein when the information update request contains indication information of ISR activation, the method further comprises:

updating a control plane address of the MME stored locally.

3. The method of claim 2, further comprising:
keeping information relating to other access networks, with which the UE is registered, unchanged.

4. The method of claim 3, wherein:
the other access network is a 2G/3G access network and the current access network is an evolving universal terrestrial radio access network (E-UTRAN), or
the other access network is an E-UTRAN and the current access network is a 2G/3G access network.

5. The method of claim 1, wherein when the information update request does not contain indication information of ISR activation, the method further comprises:
updating all information stored locally for this UE with the related information received from the MME or the SGSN.

6. The method of claim 5, further comprising:
updating the information of the current access network; and
deleting information relating to other access networks, with which the UE is registered.

7. The method of claim 6, wherein:
the other access network is a 2G/3G access network and the current access network is an evolving universal terrestrial radio access network (E-UTRAN), or
the other access network is an E-UTRAN and the current access network is a 2G/3G access network.

8. The method of claim 1, wherein when the identification information for identifying the UE and the information of the current access network are a control plane tunnel endpoint identifier (TEID) corresponding to the current access network, the method further comprises:
assigning a new control plane TEID for the current access network when the control plane TEID corresponding to the current access network is null; and
storing information of the current access network.

9. The method of claim 1, wherein the identification information for identifying the UE comprises a control plane tunnel endpoint identifier (TEID) of the current access network and the information of the current access network comprises access type indication information, and when the information update request contains indication information of ISR activation, the method further comprises:
updating, by the serving gateway, a control plane address, user plane address, and user plane TEID of the MME contained in a mobility management (MM) context if the access type indication information indicates that the current access network is an evolving universal terrestrial radio access network (E-UTRAN).

10. The method of claim 1, wherein the identification information for identifying the UE comprises a control plane TEID of the current access network and the information of the current access network comprises access type indication information, and when the information update request contains indication information of ISR activation, the method further comprises:
updating, by the serving gateway, a user plane tunnel endpoint identifier (TEID) and user plane address of a base station contained in information context if the access type indication information indicates that the current access network is an evolving universal terrestrial radio access network (E-UTRAN).

11. The method of claim 1, wherein the identification information for identifying the UE comprises a control plane tunnel endpoint identifier (TEID) of the current access network and the information of the current access network comprises access type indication information, and when the information update request contains indication information of ISR activation, the method further comprises:
updating, by the serving gateway, a control plane address, user plane address and user plane TEID address of the SGSN contained in mobility management (MM) context if the access type indication information indicates that the current access network is a 2G/3G access network.

12. The method of claim 1, wherein the identification information for identifying the UE comprises a control plane TEID of the current access network and the information of the current access network comprises access type indication information, and when the information update request contains indication information of ISR activation, the method further comprises:
updating, by the serving gateway, an user plane tunnel endpoint identifier (TEID) and user plane address of the current access network in information context if the access type indication information indicates that the current access network is a 2G/3G access network.

13. A serving gateway with idle-mode signaling reduction (ISR) function, comprising:
an update request receiving unit, configured to receive an information update request containing identification information for identifying a user equipment (UE) and information of a current access network where the UE is located from one of a mobility management entity (MME) and a serving general packet radio service (GPRS) support node (SGSN); and
an information processing unit, configured to process information relating to an access network, with which the UE is registered, according to the identification information for identifying the UE and the information of the current access network where the UE is located.

14. The serving gateway of claim 13, wherein the information processing unit further comprises:
a signaling judging unit, configured to judge whether the information update request contains indication information of ISR activation; and
an information update unit, configured to update or store information of the current access network corresponding to the identification information for identifying the UE, and information of the current access network if the signaling judging unit judges that the information update request contains the indication information of ISR activation.

15. The serving gateway of claim 13, wherein the information processing unit further comprises:
a signaling judging unit, configured to judge whether the information update request contains indication information of ISR activation; and
an information update deleting unit, configured to update or store information of the current access network corresponding to the identification information for identifying the UE and information of the current access network, and delete information relating to another access network, with which the UE is registered, if the signaling judging unit judges that the information update request does not contain the indication information of ISR activation.

16. The serving gateway of claim 13, further comprising:
a control plane judging unit, configured to determine whether a control plane tunnel endpoint identifier (TEID) relating to the current access network is null when the information update request contains the control plane TEID relating to the current access network; and a distribution unit, configured to assign a new control plane TEID for the current access network when the control plane judging unit determines that the control plane TEID relating to the current access network is null; and wherein the information processing unit is further configured to store information of the current access network corresponding to the new control plane TEID assigned by the distribution unit.

17. An apparatus with idle-mode signaling reduction (ISR) function, comprising:

an update constructing unit, configured to construct an information update request containing identification information for identifying a user equipment (UE) and information of a current access network where the UE is located; and an update request sending unit, configured to send the information update request constructed by the update constructing unit to a serving gateway for performing information processing.

18. The apparatus of claim 17, further comprising:

a control plane receiving unit, configured to receive a control plane TEID of an access network, with which the UE is registered; and wherein the update constructing unit is further configured to construct the information update request containing a control plane tunnel endpoint identifier (TEID) corresponding to the current access network and transfer the information update request to the update request sending unit if the control plane TEID of the access network, with which the UE is registered, is the same as the control plane TEID of the current access network.

19. The apparatus of claim 17, further comprising:

a control plane receiving unit, configured to receive a control plane tunnel endpoint identifier (TEID) of an access network, with which the UE is registered; and wherein the update constructing unit is further configured to construct the information update request containing access type indication information and a control plane tunnel endpoint identifier (TEID) of other access network with which the UE is registered and transfer the information update request to the update request sending unit if the control plane TEID of the access network, with which the UE is registered, is the same as the control plane TEID of the current access network, with which the UE is registered.

20. The apparatus of claim 17, wherein the apparatus is a mobility management entity (MME) and serving general packet radio service (GPRS) support node (SGSN).

* * * * *